US009090235B2

(12) United States Patent
Watanabe

(10) Patent No.: US 9,090,235 B2
(45) Date of Patent: Jul. 28, 2015

(54) BRAKING FORCE CONTROL DEVICE FOR VEHICLE AND BRAKING FORCE CONTROL METHOD FOR VEHICLE

(75) Inventor: Yoshinori Watanabe, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/883,646

(22) PCT Filed: Nov. 30, 2011

(86) PCT No.: PCT/IB2011/002871
§ 371 (c)(1),
(2), (4) Date: May 6, 2013

(87) PCT Pub. No.: WO2012/073094
PCT Pub. Date: Jun. 7, 2012

(65) Prior Publication Data
US 2013/0231840 A1 Sep. 5, 2013

(30) Foreign Application Priority Data

Nov. 30, 2010 (JP) ................................. 2010-266962

(51) Int. Cl.
| G06F 7/70 | (2006.01) |
| G06F 19/00 | (2011.01) |
| G06G 7/00 | (2006.01) |
| G06G 7/76 | (2006.01) |
| B60T 8/28 | (2006.01) |
| B60T 8/26 | (2006.01) |
| B60T 8/00 | (2006.01) |
| B60T 8/1766 | (2006.01) |
| B60K 28/16 | (2006.01) |

(52) U.S. Cl.
CPC ... *B60T 8/28* (2013.01); *B60T 8/00* (2013.01); *B60T 8/1766* (2013.01); *B60T 8/26* (2013.01); *B60K 28/16* (2013.01)

(58) Field of Classification Search
USPC ....................... 701/70, 71, 75, 79, 81, 74, 72; 303/113.5, 115.2, 115.4, 116.2, 303/122.01, 122.12, 122.13, 125, 140, 146, 303/147, 148, 163, 190, 186; 477/35, 37, 477/33
See application file for complete search history.

(56) References Cited

U.S. PATENT DOCUMENTS 4,485,445 A * 11/1984 Braschel .......................... 701/79
6,027,183 A * 2/2000 Katayose et al. ............. 303/146

(Continued)

FOREIGN PATENT DOCUMENTS

DE 196 51 460 6/1998
JP 01 301447 12/1989

(Continued)

OTHER PUBLICATIONS

International Search Report Issued Mar. 23, 2012 in PCT/IB11/0028871 filed Nov. 30, 2011.

*Primary Examiner* — Tuan C. To
*Assistant Examiner* — Isaac Smith
(74) *Attorney, Agent, or Firm* — Oblon, McClelland, Maier & Neustadt, L.L.P.

(57) ABSTRACT

A braking force control device for a vehicle that performs front and rear wheel distribution control of braking force by controlling individually braking pressures of left and right rear wheels such that, during braking, a wheel speed of a rear wheel takes on a value lying within a target control range that satisfies a predefined relationship with respect to a wheel speed of a front wheel. When a wheel speed of a second rear wheel takes on a value lying outside the target control range, in a situation where a wheel speed of a first rear wheel is a value lying within the target control range and lying outside a sub-target control range that is narrower than the target control range, then braking pressures of the left and right rear wheels are controlled simultaneously in such a manner that the wheel speed of the second rear wheel takes on a value lying within the target control range and the wheel speed of the first rear wheel approaches the sub-target control range.

11 Claims, 14 Drawing Sheets

(56) References Cited

U.S. PATENT DOCUMENTS

| | | | |
|---|---|---|---|
| 6,322,167 B1 * | 11/2001 | Pruhs et al. | 303/146 |
| 6,595,600 B2 * | 7/2003 | Banno et al. | 303/113.5 |
| 6,880,900 B2 * | 4/2005 | Hara et al. | 303/170 |
| 2004/0130209 A1 | 7/2004 | Soejima et al. | |

FOREIGN PATENT DOCUMENTS

| | | |
|---|---|---|
| JP | 09-315283 | 12/1997 |
| JP | 10 138895 | 5/1998 |
| JP | 11-321601 | 11/1999 |
| JP | 2002037044 A * | 2/2002 |

* cited by examiner

BRAKING FORCE CONTROL DEVICE FOR VEHICLE AND BRAKING FORCE CONTROL METHOD FOR VEHICLE

BACKGROUND OF THE INVENTION

1. Field of the Invention

The invention relates to a braking force control device for a vehicle and a braking force control method for a vehicle. More specifically, the invention relates to a braking force control device for a vehicle and a braking force control method for a vehicle in which there is performed front and rear wheel distribution control of a braking force by controlling individually braking pressures of left and right rear wheels such that, during braking, a wheel speed of a rear wheel takes on a value lying within a target control range that satisfies a predefined relationship with respect to a wheel speed of a front wheel.

2. Description of Related Art

Braking force control devices that perform front and rear wheel distribution control of braking force are conventionally available. For instance, Japanese Patent Application Publication No. 10-138895 discloses a braking force control device that controls individually a braking force of rear wheels by controlling individually braking pressures of left and right rear wheels on the basis of a difference between the wheel speed of each rear wheel and the highest wheel speed from among the wheel speeds of the left and right front wheels.

In a vehicle equipped with a conventional braking force control device that performs front and rear wheel distribution control of braking force in the manner of the braking force control device disclosed in JP-A-10-138895 (JP-A-10-138895), braking pressure is controlled through control of control valves such as electromagnetic-type pressure-increasing valves and pressure-decreasing valves, that are provided for each wheel.

The control valves of the left and right rear wheels are controlled individually in front and rear wheel distribution control of braking force wherein the braking pressure of the left and right rear wheels is controlled individually. Accordingly, the operational frequency of the control valves of all the left and right rear wheels is higher than in a case where the control valves of the left and right rear wheels are controlled simultaneously. Therefore, it is not possible to avoid an increased frequency of occurrence of transmission, to a brake pedal and so forth, of vibration and noise generated accompanying the operation of the control valves. Conventional braking force control devices have thus room for improvement in terms of securing sensory quality.

SUMMARY OF THE INVENTION

The invention provides a braking force control device for a vehicle and a braking force control method for a vehicle that enhance sensory quality as compared with conventional methods and devices, through a decrease in the frequency of occurrence of transmission, to a brake pedal and so forth, of vibration and noise generated accompanying the operation of the control valves, but without significantly sacrificing performance in front and rear wheel distribution control of braking force, according to conventional braking force control devices for a vehicle and conventional braking force control methods for a vehicle in which front and rear wheel distribution control of braking force is performed by controlling individually the braking pressure of the left and right rear wheels.

The above-described main problem is solved by a first to sixth aspect of the invention. A first to third aspect of the invention relate to a braking force control device for a vehicle that performs front and rear wheel distribution control of a braking force by controlling separately braking pressures of left and right rear wheels in such a manner that, during braking, a wheel speed of a rear wheel takes on a value lying within a target control range that satisfies a predefined relationship with respect to a wheel speed of a front wheel.

A braking force control device for a vehicle in a first aspect has a control unit that performs simultaneous control of simultaneously controlling braking pressures of left and right rear wheels such that, when a wheel speed of a first rear wheel is a value lying within the target control range and lying outside a sub-target control range that is narrower than the target control range, and a wheel speed of a second rear wheel is a value lying outside the target control range, the wheel speed of the second rear wheel takes on a value lying within the target control range and the wheel speed of the first rear wheel approaches the sub-target control range.

A braking force control device for a vehicle in a second aspect has a reduction control unit that makes a reduction control amount of braking pressure greater when an elapsed time from a point in time at which front and rear wheel distribution control of braking force is started, or a point in time at which reduction control of braking pressure is started in front and rear wheel distribution control of braking force, is equal to or shorter than a reference time, as compared with when the elapsed time is longer than the reference time.

A braking force control device for a vehicle in a third aspect has a control unit that performs simultaneous control of simultaneously controlling braking pressures of left and right rear wheels such that, when a degree of slip of a first rear wheel is a value lying within the target control range and lying outside a sub-target control range that is narrower than the target control range, and a degree of slip of a second rear wheel is a value lying outside the target control range, the degree of slip of the second rear wheel takes on a value lying within the target control range and the degree of slip of the first rear wheel approaches the sub-target control range.

A fourth to sixth aspect of the invention relate to a braking force control method for a vehicle, for performing front and rear wheel distribution control of a braking force by controlling individually braking pressures of left and right rear wheels such that, during braking, a wheel speed of a rear wheel takes on a value lying within a target control range that satisfies a predefined relationship with respect to a wheel speed of a front wheel.

A braking force control method for a vehicle in a fourth aspect has a step of performing simultaneous control of simultaneously controlling braking pressures of left and right rear wheels such that, when a wheel speed of a first rear wheel is a value lying within the target control range and lying outside a sub-target control range that is narrower than the target control range, and a wheel speed of a second rear wheel is a value lying outside the target control range, the wheel speed of the second rear wheel takes on a value lying within the target control range and the wheel speed of the first rear wheel approaches the sub-target control range.

A braking force control method for a vehicle in a fifth aspect has a step of making a reduction control amount of braking pressure greater when an elapsed time from a point in time at which front and rear wheel distribution control of braking force is started, or a point in time at which reduction control of braking pressure is started in front and rear wheel distribution control of braking force, is equal to or shorter than a reference time, as compared with when the elapsed time is longer than the reference time.

A braking force control method for a vehicle in a sixth aspect has a step of performing simultaneous control of simultaneously controlling braking pressures of left and right rear wheels such that, when a degree of slip of a first rear wheel is a value lying within the target control range and lying outside a sub-target control range that is narrower than the target control range, and a degree of slip of a second rear wheel is a value lying outside the target control range, the degree of slip of the second rear wheel takes on a value lying within the target control range and the degree of slip of the first rear wheel approaches the sub-target control range.

In the first to fourth aspects, in a situation where the wheel speed of one rear wheel (first rear wheel) is a value lying within a target control range and outside a sub-target control range, there is determined a situation in which the wheel speed of the other rear wheel (second rear wheel) takes on a value lying outside the target control range. In such a situation, the braking pressure of the left and right rear wheels is controlled simultaneously such that the wheel speed of the other rear wheel takes on a value lying within the target control range and the wheel speed of the one rear wheel approaches the sub-target control range.

Therefore, the operation frequency of the control valves of all the left and right rear wheels can be reduced as compared with an instance wherein the respective braking pressures are controlled such that the wheel speed of each rear wheel takes on a value lying within the target control range at a time where the wheel speeds of the left and right rear wheels take on values that lie outside the target control range. As a result, it becomes possible to reduce the frequency of occurrence of transmission, to a brake pedal and so forth, of vibration and noise generated accompanying the operation of the control valves, and there can be enhanced the sensory quality of the braking force control device.

The braking pressure of the one rear wheel is controlled such that the wheel speed of that wheel approaches the sub-target control range. Therefore, it becomes possible to prevent the wheel speed of that wheel from taking on a value lying outside the target control range. Fundamentally, therefore, simultaneous control of the braking pressure of the left and right rear wheels does not impair significantly the performance of front and rear wheel distribution control of braking force that is performed by controlling individually the braking pressure of the left and right rear wheels.

In the second and fifth aspects above, a reduction control amount of braking pressure is made greater when an elapsed time from a point in time at which front and rear wheel distribution control of braking force is started, or a point in time at which reduction control of braking pressure is started in front and rear wheel distribution control of braking force, is equal to or shorter than a reference time, as compared with when the elapsed time is longer than the reference time.

Therefore, it becomes possible to reduce the braking pressure by a large reduction control amount, and to reduce the frequency and number of times that the control valves are operated intermittently, when the elapsed time is equal to or shorter than a reference time. Therefore, the frequency of occurrence of transmission, to a brake pedal and so forth, of vibration and noise generated accompanying the operation of the control valves can be reduced, and the sensory quality of the braking force control device can be enhanced, vis-à-vis an instance where the reduction control amount of braking pressure does not increase also when the elapsed time is equal to or shorter than a reference time.

The reduction control amount of braking pressure is not increased when the elapsed time is longer than the reference time. As a result, this allows lowering the likelihood of excessive reduction of braking pressure, and the likelihood of resulting hunting wherein braking pressure is repeatedly increased and decreased, as well as the likelihood of greater operation frequency of the control valve that arises from the foregoing, in a situation where the elapsed time is longer than the reference time.

In the simultaneous control in the first or fourth aspect, a control amount of braking pressure of the first rear wheel may be smaller than a control amount of braking pressure of the second rear wheel.

In the above configuration, the control amount of braking pressure of the one rear wheel is smaller than the control amount of braking pressure of the other rear wheel. Accordingly, it becomes possible to control simultaneously the braking pressure of the left and right rear wheels while avoiding an excessive reduction in the braking pressure of the one rear wheel.

In the first or fourth aspect, the control of the braking pressure of the first rear wheel through front and rear wheel distribution control of the braking force may end when the wheel speed of the second rear wheel takes on a value lying within the target control range.

In such a configuration, control of the braking pressure of the one rear wheel through front and rear wheel distribution control of braking force is over when the wheel speed of the other rear wheel takes on a value lying within the target control range. Hence, it becomes possible to terminate control of the braking pressure of the one rear wheel simultaneously with termination of control of the braking pressure of the other rear wheel, and it becomes possible to prevent the control of the braking pressure of the one rear wheel from continuing excessively, when the wheel speed of the other rear wheel takes on a value lying within the target control range.

In the first or fourth aspect, a reduction control amount of braking pressure may be made greater when an elapsed time from a point in time at which front and rear wheel distribution control of braking force is started is equal to or shorter than a reference time, as compared with when the elapsed time is longer than the reference time.

In such a configuration, a reduction control amount of braking pressure is made greater when an elapsed time from a point in time at which front and rear wheel distribution control of braking force is started is equal to or shorter than a reference time, as compared with when the elapsed time is longer than the reference time.

As in the case of the second or fifth aspect, therefore, it becomes possible to reduce the braking pressure by a large reduction control amount, and to reduce the frequency and number of times that the control valves are operated intermittently, when the elapsed time is equal to or shorter than a reference time. Therefore, the frequency of occurrence of transmission, to a brake pedal and so forth, of vibration and noise generated accompanying the operation of the control valves can be reduced, and the sensory quality of the braking force control device can be enhanced vis-à-vis an instance where the reduction control amount of braking pressure does not increase also when the elapsed time is equal to or shorter than a reference time.

In this configuration as well, the reduction control amount of braking pressure is not increased when the elapsed time is longer than the reference time. As a result, this allows lowering the likelihood of excessive reduction of braking pressure, and the likelihood of resulting hunting wherein braking pressure is repeatedly increased and decreased, as well as the likelihood of greater operation frequency of the control valve that arises from the foregoing, in a situation where the elapsed time is longer than the reference time.

In the first to sixth aspects above, the reference time may be variably set, in accordance with an index value of vehicle deceleration, in such a way so as to be longer when the deceleration index value is high than when the deceleration index value is low.

In such a configuration, the reference time is variably set, in accordance with an index value of vehicle deceleration, in such a way so as to be longer when the deceleration index value is high than when the deceleration index value is low.

Therefore, the reference time can be made longer when the vehicle deceleration is high than when the deceleration is low, and hence the time over which the braking pressure is reduced by a large reduction control amount can be lengthened, and the braking pressure can thus be reduced by a large reduction control amount, over a sufficient lapse of time. Accordingly, it becomes possible to reduce the frequency of repeated intermittent operation of the control valves in a situation where the braking force of the rear wheels becomes readily excessive, through greater vehicle deceleration and increased load transfer towards the vehicle front, as compared with an instance where the reference time is not variably set in accordance with an index value of deceleration.

In the first to sixth aspects above, an amount by which there is increased the reduction control amount of braking pressure may be variably set, in accordance with an index value of vehicle deceleration, in such a way so as to be greater when the deceleration index value is high than when the deceleration index value is low.

In such a configuration, an amount by which there is increased the reduction control amount of braking pressure is variably set, in accordance with an index value of vehicle deceleration, in such a way so as to be greater when the deceleration index value is high than when the deceleration index value is low.

Therefore, the reduction control amount of braking pressure can be made greater when vehicle deceleration is high than when vehicle deceleration is low. Accordingly, this allows reducing efficiently braking pressure by a large reduction control amount in a situation where the braking force of the rear wheels becomes readily excessive, on account of a large load transfer towards the vehicle front. Conversely, it becomes also possible to prevent a reduction in braking pressure from being excessive in a situation where the braking force of the rear wheels is unlikely to be excessive on account of a small load transfer towards the vehicle front.

In the first to sixth aspects above, the reference time may be variably set, in accordance with an index value of a rate of increase in deceleration of the vehicle, in such a way so as to be longer when the index value of a rate of increase in deceleration is high than when the index value of a rate of increase in deceleration is low.

In such a configuration, the reference time is variably set, in accordance with an index value of a rate of increase in deceleration of the vehicle, in such a way so as to be longer when the index value of a rate of increase in deceleration is high than when the index value of a rate of increase in deceleration is low. Accordingly, the reference time can be made longer when the vehicle deceleration is high than when the deceleration is low, without a need for detecting or estimating vehicle deceleration.

Therefore, the reference time can be made longer when the rate of increase of vehicle deceleration is high than when the rate of increase of deceleration is low. Accordingly, the time over which the braking pressure is reduced by a large reduction control amount can be lengthened, and the braking pressure can thus be reduced by a large reduction control amount, over a sufficient lapse of time. Therefore, it becomes possible to lower the likelihood of repeated intermittent operation of the control valves in a situation where the braking force of the rear wheels becomes readily excessive, on account of a high rate of increase of vehicle deceleration and fast load transfer towards the vehicle front, as compared with an instance where the reference time is not variably set in accordance with an index value of the rate of increase of deceleration.

In the first to sixth aspects above, the amount by which there is increased the reduction control amount of braking pressure may be variably set, in accordance with the index value of a rate of increase in deceleration, in such a way so as to be greater when the index value of a rate of increase in deceleration is high than when the index value of a rate of increase in deceleration is low.

In the above configuration, the amount by which there is increased the reduction control amount of braking pressure is variably set, in accordance with an index value of a rate of increase in deceleration of the vehicle, in such a way so as to be greater when the index value of a rate of increase in deceleration is high than when the index value of a rate of increase in deceleration is low. Accordingly, the amount by which there is increased the reduction control amount of braking pressure can be made greater when the rate of increase of the vehicle deceleration is high than when the rate of increase of vehicle deceleration is low, without a need for detecting or estimating the rate of increase of vehicle deceleration.

Therefore, this allows reducing efficiently braking pressure by a large reduction control amount in a situation where the braking force of the rear wheels becomes readily excessive due to fast load transfer towards the vehicle front. Conversely, it becomes also possible to prevent a reduction in braking pressure from being excessive in a situation where the braking force of the rear wheels is unlikely to be excessive on account of slow load transfer towards the vehicle front.

In the first to sixth aspects above, the index value of a rate of increase in deceleration may be a time from a point in time at which vehicle braking is started until start of control of braking pressure of the rear wheels through the front and rear wheel distribution control of braking force.

The time from a point in time at which vehicle braking is started until start of control of braking pressure of the rear wheels through the front and rear wheel distribution control of braking force is shorter the higher the rate of increase of vehicle deceleration is. Accordingly, the rate of increase of vehicle deceleration can be estimated on the basis of the time from a point in time at which vehicle braking is started until start of control of braking pressure of the rear wheels through the front and rear wheel distribution control of braking force.

In the above configuration, the index value of a rate of increase in deceleration is the time from a point in time at which vehicle braking is started until start of control of braking pressure of the rear wheels through the front and rear wheel distribution control of braking force. Therefore, the reference time and/or the amount by which there is increased the reduction control amount of braking pressure can be variably set, in accordance with the rate of increase of deceleration, by variably setting the amount by which there is increased the reference time, and/or the amount by which there is increased the reduction control amount of braking pressure, in accordance with the above-described time.

In the first to sixth aspects above, the sub-target control range may have an upper limit value that is smaller than the upper limit value of the target control range, and a lower limit value that is greater than the lower limit value of the target control range.

In the first to sixth aspects above, the upper limit value and lower limit value of the target control range may be variably set in accordance with vehicle speed or vehicle deceleration in such a way so as to be greater when vehicle speed or vehicle deceleration is high than when vehicle speed or vehicle deceleration is low.

In the first to sixth aspects above, a difference between the upper limit value of the target control range and the upper limit value of the sub-target control range, and a difference between the lower limit value of the sub-target control range and the lower limit value of the target control range may be set to be constant.

In the first to sixth aspects above, the difference between the upper limit value of the target control range and the upper limit value of the sub-target control range, and the difference between the lower limit value of the sub-target control range and the lower limit value of the target control range may be variably set in accordance with vehicle speed, or vehicle deceleration, or a vehicle deceleration slope, in such a way so as to be greater when vehicle speed, or vehicle deceleration, or the vehicle deceleration slope is high than when vehicle speed, or vehicle deceleration, or the vehicle deceleration slope is low.

In the first to sixth aspects above, control of the braking pressure of one rear wheel may be terminated when the wheel speed of the one rear wheel takes on a value lying within a sub-target control range, in a situation where the braking pressure of the left and right rear wheels is controlled simultaneously.

In the first to sixth aspects above, the reduction control amount of braking pressure may be a reduction slope of braking pressure

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Several preferred embodiments of the invention will be described below in greater detail with reference to the appended drawings.

[First Embodiment]

Figure 1:
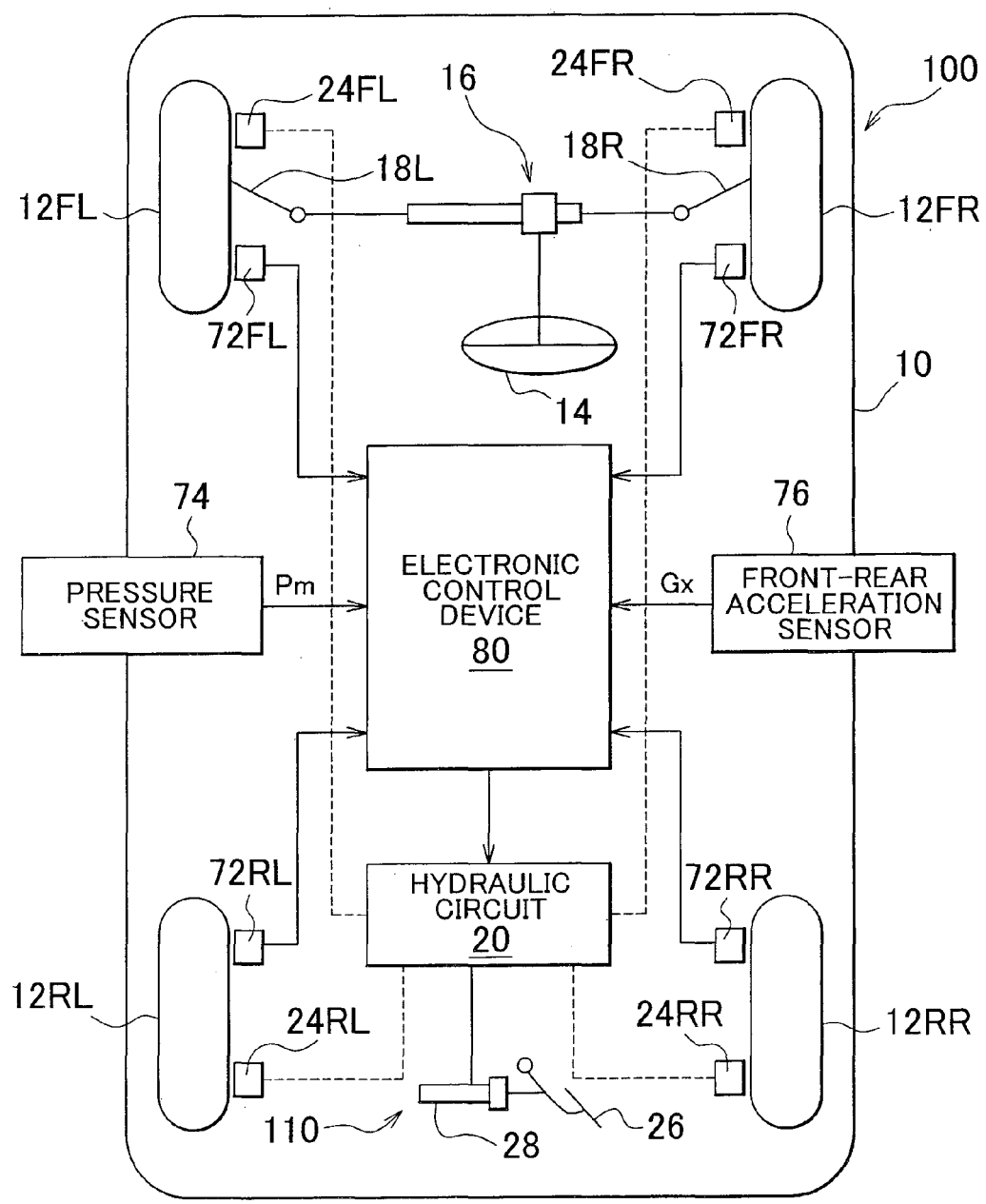
FIG. 1 is a schematic diagram illustrating a first embodiment of a braking force control device for a vehicle according to the invention.
Figure 2:
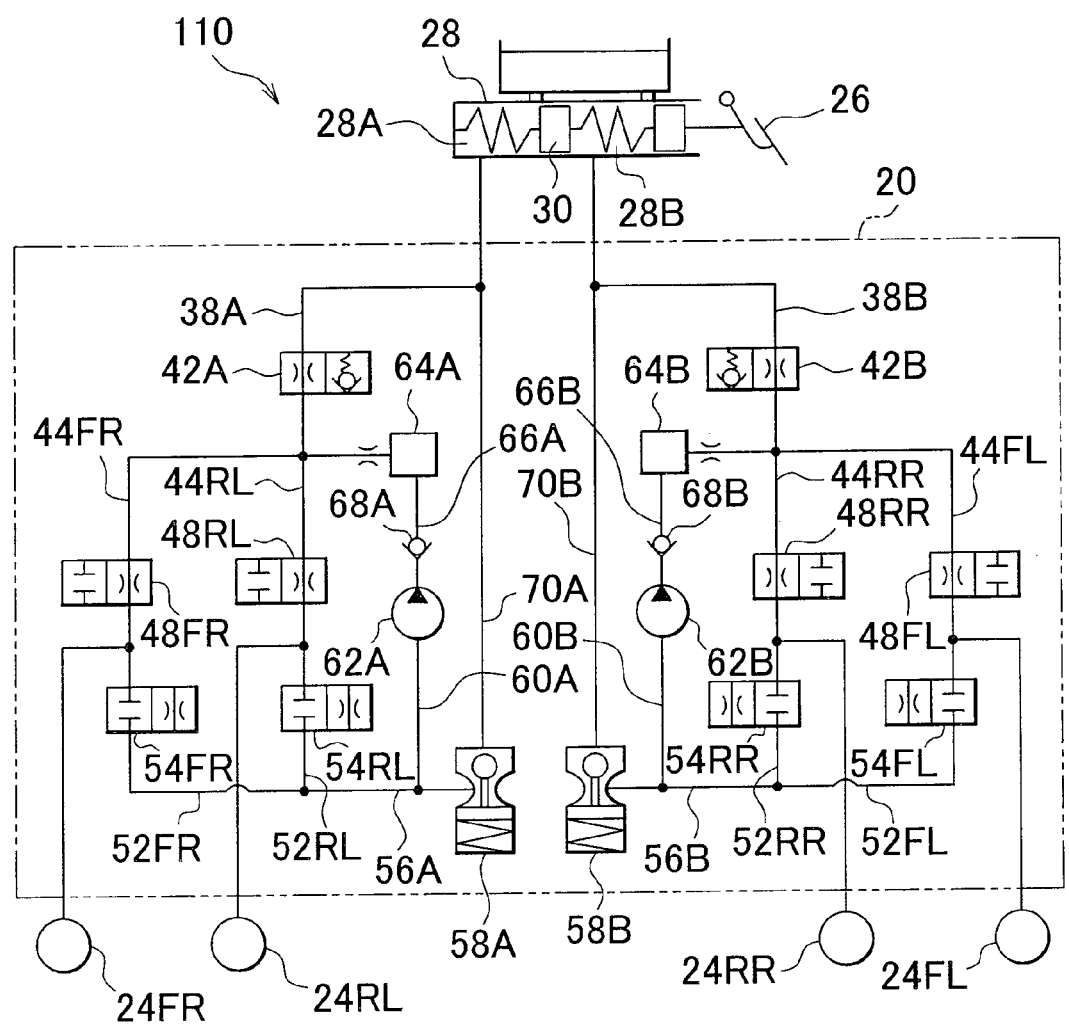
FIG. 2 is diagram illustrating a braking device illustrated in FIG. 1.

FIG. 1 is a schematic configuration diagram illustrating the first embodiment of the braking force control device for a vehicle in accordance with an aspect of the invention. FIG. 2 illustrates the brake device shown in FIG. 1.

In FIG. 1, the reference numeral 100 stands for the entire braking force control device of a vehicle 10. The vehicle 10 has left and right front wheels 12FL and 12FR and left and right rear wheels 12RL and 12RR. The left and right front wheels 12FL and 12FR that are the steered wheels are steered via tie rods 18L and 18R by a power steering device 16 of a rack and pinion type that is driven in response to the operation of a steering wheel 14 performed by the driver.

The brake force of each wheel is controlled by controlling a pressure Pi (i=fr, fl, rr, rl) inside wheel cylinders 24FR, 24FL, 24RR, 24RL, that is, the brake pressure of each wheel, by a hydraulic circuit 20 serving as a brake actuator of the brake device 110. As shown in FIG. 2, the brake device 100 has a master cylinder 28 that pumps brake oil in response to the step-down operation performed by the driver with respect to the brake pedal 26. The master cylinder 28 has a first master cylinder chamber 28A and a second master cylinder chamber 28B that are partitioned by a free piston 30 impelled to a predetermined position by compression coil springs located on both sides thereof.

The first master cylinder chamber 28A and the second master cylinder chamber 28B are connected to one end of a brake hydraulic control conduit 38A of the first system and a brake hydraulic control conduit 38B of the second system, respectively. The brake hydraulic control conduits 38A and 38B connect the master cylinder chambers 28A and 28B to a hydraulic circuit 20.

A communication control valve 42A of the first system is provided in the intermediate section of the brake hydraulic control conduit 38A. In the embodiment shown in the figure, the communication control valve 42A is a linear solenoid valve of a normally open type. The communication control valve 42A is open when a solenoid (not shown in FIG. 2) is not energized by the drive current and closed when the solenoid is energized by the drive current. In particular, when the communication control valve 42A is in the closed state, the differential pressure is maintained such that the pressure on the side opposite that of the master cylinder 28 in the brake hydraulic control conduit 38A corresponding to the communication control valve 42A is higher than the pressure on the master cylinder 28 side, and the differential pressure is increased or decreased according to the voltage of the drive current.

In other words, when the difference in pressure across the communication control valve 42A is equal to or less than an indicated differential pressure determined by the voltage of the drive current relating to the solenoid, the communication control valve 42A maintains the closed state. Therefore, the communication control valve 42A prevents the oil serving as a working fluid from flowing to the master cylinder 28 side through the communication control valve 42A from the side opposite that of the master cylinder 28. As a result, the differential pressure across the communication control valve 42A is prevented from decreasing. By contrast, where the differential pressure across the communication control valve 42A exceeds the indicated differential pressure determined by the voltage of the drive current relating to the solenoid, the communication control valve 42A is open. Therefore, the communication control valve 42A allows the oil to flow to the master cylinder 28 side via the communication control valve 42A from the side opposite that of the master cylinder 28. As a result, the differential pressure across the communication control valve 42A is controlled to the indicated differential pressure.

One end of a brake hydraulic control conduit 44FR for the right front wheel and one end of a brake hydraulic control conduit 44RL for the left rear wheel are connected to the other end of the brake hydraulic control conduit 38A of the first system. Wheel cylinders 24FR and 24RL for controlling the brake force of the right front wheel and left rear wheel, respectively, are connected to the other end of the brake hydraulic control conduit 44FR for the right front wheel and the other end of the brake hydraulic control conduit 44RL for the left rear wheel. Respective electromagnetic opening-closing valves 48FR and 48RL of a normally open type are provided in the intermediate sections of the brake hydraulic control conduit 44FR for the right front wheel and the other end of the brake hydraulic control conduit 44RL for the left rear wheel.

One end of an oil discharge conduit 52FR is connected to the brake hydraulic control conduit 44FR between the electromagnetic opening-closing valve 48FR and the wheel cylinder 24FR, and one end of an oil discharge conduit 52RL is connected to the brake hydraulic control conduit 44RL between the electromagnetic opening-closing valve 48RL and the wheel cylinder 24RL. Respective electromagnetic opening-closing valves 54FR and 54RL of a normally closed type are provided in the intermediate sections of the oil discharge conduits 52FR and 52RL, and the other ends of the oil discharge conduits 52FR and 52RL are connected by a connection conduit 56A to a reservoir 58A of the first system that stores the oil.

As described hereinabove, the electromagnetic opening-closing valves 48FR and 48RL are pressure-increasing valves for increasing or maintaining the pressure inside the wheel cylinders 24FR and 24RL, respectively, and the electromagnetic opening-closing valves 54FR and 54RL are pressure-reducing valves for reducing the pressure inside the wheel cylinders 24FR and 24RL, respectively. Therefore, the electromagnetic opening-closing valves 48FR and 54FR define, by combined operation thereof, the pressure-increasing-reducing valves for increasing, reducing, or maintaining the pressure inside the wheel cylinder 24FR of the right front wheel, and the electromagnetic opening-closing valves 48RL and 54RL define, by combined operation thereof, the pressure-increasing-reducing valves for increasing, reducing, or maintaining the pressure inside the wheel cylinder 24RL of the left rear wheel.

The connection conduit 56A is connected to the intake side of a pump 62A by a connection conduit 60A. The discharge side of the pump 62A is connected to the other end of the brake hydraulic control conduit 38A by a connection conduit 66A having a damper 64A in the intermediate section thereof. A check valve 68A that allows only the flow of oil from the pump 62A to the damper 64A is provided in the connection conduit 66A between the pump 62A and the damper 64A.

Likewise, a communication control valve 42B of the second system is provided in the intermediate section of the brake hydraulic control conduit 38B. In the embodiment shown in the figures, the communication control valve 42B is also a linear solenoid valve of a normally open type and operates similarly to the communication control valve 42A. Therefore, by controlling the voltage of the drive current applied to the solenoid (not shown in FIG. 2), it is possible to restrict the flow of oil from the wheel cylinders 24FL and 24RR to the master cylinder 28 side via the communication control valve 42B, and the differential pressure across the communication control valve 42B is controlled to the indicated differential pressure.

One end of a brake hydraulic control conduit 44FL for the left front wheel and one end of a brake hydraulic control conduit 44RR for the right rear wheel are connected to the other end of the brake hydraulic control conduit 38B of the second system. Wheel cylinders 24FL and 24RR for controlling the brake force of the left front wheel and right rear wheel, respectively, are connected to the other end of the brake hydraulic control conduit 44FL for the left, front wheel and the other end of the brake hydraulic control conduit 44RR for the right rear wheel. Respective electromagnetic opening-closing valves 48FL and 48RR of a normally open type are provided in the intermediate sections of the brake hydraulic control conduit 44FL for the left front wheel and the other end of the brake hydraulic control conduit 44RR for the right rear wheel.

One end of an oil discharge conduit 52FL is connected to the brake hydraulic control conduit 44FL between the electromagnetic opening-closing valve 48FL and the wheel cylinder 24FL, and one end of an oil discharge conduit 52RR is connected to the brake hydraulic control conduit 44RR between the electromagnetic opening-closing valve 48RR and the wheel cylinder 24RR. Respective electromagnetic opening-closing valves 54FL and 54RR of a normally closed type are provided in the intermediate sections of the oil discharge conduits 52FL and 52RR, and the other ends of the oil discharge conduits 52FL and 52RR are connected by a connection conduit 56B to a reservoir 58B of the second system that stores the oil.

As described hereinabove, the electromagnetic opening-closing valves 48FL and 48RR are pressure-increasing valves for increasing or maintaining the pressure inside the wheel cylinders 24FL and 24RR, respectively, and the electromagnetic opening-closing valves 54FL and 54RR are pressure-reducing valves for reducing the pressure inside the wheel cylinders 24FL and 24RR, respectively. Therefore, the electromagnetic opening-closing valves 48FL and 54FL define, by combined operation thereof, the pressure-increasing-reducing valves for increasing, reducing, or maintaining the pressure inside the wheel cylinder 24FL of the left front wheel, and the electromagnetic opening-closing valves 48RR and 54RR define, by combined operation thereof, the pressure-increasing-reducing valves for increasing, reducing, or maintaining the pressure inside the wheel cylinder 24RR of the right rear wheel.

The connection conduit 56B is connected to the intake side of a pump 62B by a connection conduit 60B. The discharge side of the pump 62B is connected to the other end of the brake hydraulic control conduit 38B by a connection conduit 66B having a damper 64B in the intermediate section thereof. A check valve 68B that allows only the flow of oil from the pump 62B to the damper 64B is provided in the connection conduit 66B between the pump 62B and the damper 64B. The pumps 62A and 62B are driven by a common electric motor (not shown in FIG. 1).

The reservoirs 58A, 58B are connected by respective connection conduits 70A, 70B to the brake hydraulic control conduits 38A, 38B between the master cylinder 28 and the communication control valves 42A, 42B. Therefore, when the communication control valves 42A, 42B are in a closed state, the reservoirs 58A, 58B allow the flow of oil between the master cylinder chambers 28A, 28B and the reservoirs 58A, 58B. Further, valve bodies of check valves are integrally fixed to the free pistons of the reservoirs 58A, 58B, and the check valves prevent the amount of oil inside the reservoirs 58A, 58B from being equal to or higher than a reference value.

In the embodiment shown in the figure, when the corresponding solenoids are not energized by a drive current, the control valves and opening-closing valves are set to non-control positions shown in FIG. 2. As a result, the pressure inside the first master cylinder chamber 28A is supplied to the wheel cylinders 24FR and 24RL, and a pressure inside the second master, cylinder 28B is supplied to the wheel cylinders 24FL and 24RR. Therefore, during normal operation, the pressure inside the wheel cylinders of the wheels, that is the brake force increases or decreases according to the step-on force on the brake pedal 26.

By contrast, when the communication control valves 42A, 42B are switched to the closed position and the pumps 62A, 62B are driven in a state in which the opening-closing valves of the wheels are in the positions shown in FIG. 2, the oil in the reservoirs 58A, 58B is lifted by the pumps. Therefore, the pressure that has been pumped up by the pump 62A is supplied to the wheel cylinders 24FR, 24RL, and the pressure pumped up by the pump 62B is supplied to the wheel cylinders 24FL, 24RR. Therefore, the brake pressure of each wheel is increased and reduced by opening and closing of the communication control valves 42A, 42B and opening-closing valves (pressure-increasing-reducing valves) of the wheels, regardless of the step-on force on the brake pedal 26.

In this case, the pressure inside the wheel cylinder is increased (pressure increase mode) when the opening-closing valves 48FR, 48RL (48RR, 48FL) and the opening-closing valves 54FR, 54RL (54RR, 54FL) are in the non-control positions shown in FIG. 2, held (holding mode) when the opening-closing valves 48FR, 48RL (48RR, 48FL) are switched to the closed position and the valves 54FR, 54RL (54RR, 54FL) are in the non-control positions shown in FIG. 2, and reduced (pressure reduction mode) when the opening-closing valves 48FR, 48RL (48RR, 48FL) are switched to the closed position and the valves 54FR, 54RL (54RR, 54FL) are switched to the open positions.

Motors that drive the communication control valves 42A and 42B, opening-closing valves 48FR, 48RL, 48RR, and 48FL, opening-closing valves 54FR, 54RL, 54RR, and 54FL, and pumps 62A, 62B are controlled by the below-described electronic control unit 80. The electronic control unit 80 is constituted by a microcomputer and a drive circuit (this configuration is not shown in FIG. 1). The microcomputer may have a typical configuration that is common in the pertinent technical field that includes a central processing unit (CPU), a random access memory (RAM), and a read only memory (ROM).

Wheel speed sensors 72FR, 72FL, 72RR, 72RL that detect a respective wheel speed Vwi (i=fr, fl, rr, rl) are provided in each wheel 12FR, 12FL, 12RR, 12RL. A pressure sensor 74 that detects a master cylinder pressure Pm is provided in the master cylinder 28. A front-rear acceleration sensor 76 that detects a vehicle front-rear acceleration Gx is provided in the vehicle 10. Signals denoting values detected by respective sensors are inputted to the electronic control device 80. A front-rear acceleration sensor 76 detects the front-rear acceleration Gx taking the vehicle acceleration direction as positive.

The electronic control device 80 controls the braking pressure of the left and right front wheels on the basis of the master cylinder pressure Pm. As a result, the braking force of the left and right front wheels is controlled in accordance with degree of depression of the brake pedal 26, i.e. in accordance with a braking operation amount by the driver. As explained in detail further on, the electronic control device 80 performs control, in order to bring about a preferred front and rear wheel distribution of braking force, in accordance with the flowchart illustrated in FIGS. 3 and 4.

In the first embodiment, in particular, the electronic control device 80 calculates an upper limit value Vwrtu and a lower limit value Vwrtl of a target control range of wheel speed, of the rear wheels, that satisfy a predefined relationship with respect to the highest wheel speed from among the wheel speeds of the left and right front wheels. The electronic control device 80 calculates an upper limit value Vwrtus and a lower limit value wrtls of a sub-target control range that lies within the target control range and that is narrower than the latter.

In a situation where the wheel speed of one rear wheel exceeds the upper limit value Vwrtu of the target control range, the electronic control device 80 increases simultaneously the braking pressure of the left and right rear wheels when the wheel speed of the other rear wheel is equal to or smaller than the upper limit value Vwrtu of the target control range and exceeds the upper limit value Vwrtus of the sub-target control range.

In a situation where the wheel speed of one rear wheel is lower than the lower limit value Vwrtl of the target control range, the electronic control device 80 decreases simultaneously the braking pressure of the left and right rear wheels when the wheel speed of the other rear wheel is equal to or greater than the lower limit value Vwrtl of the target control range and is smaller than the lower limit value wrtls of the sub-target control range.

Figure 3:
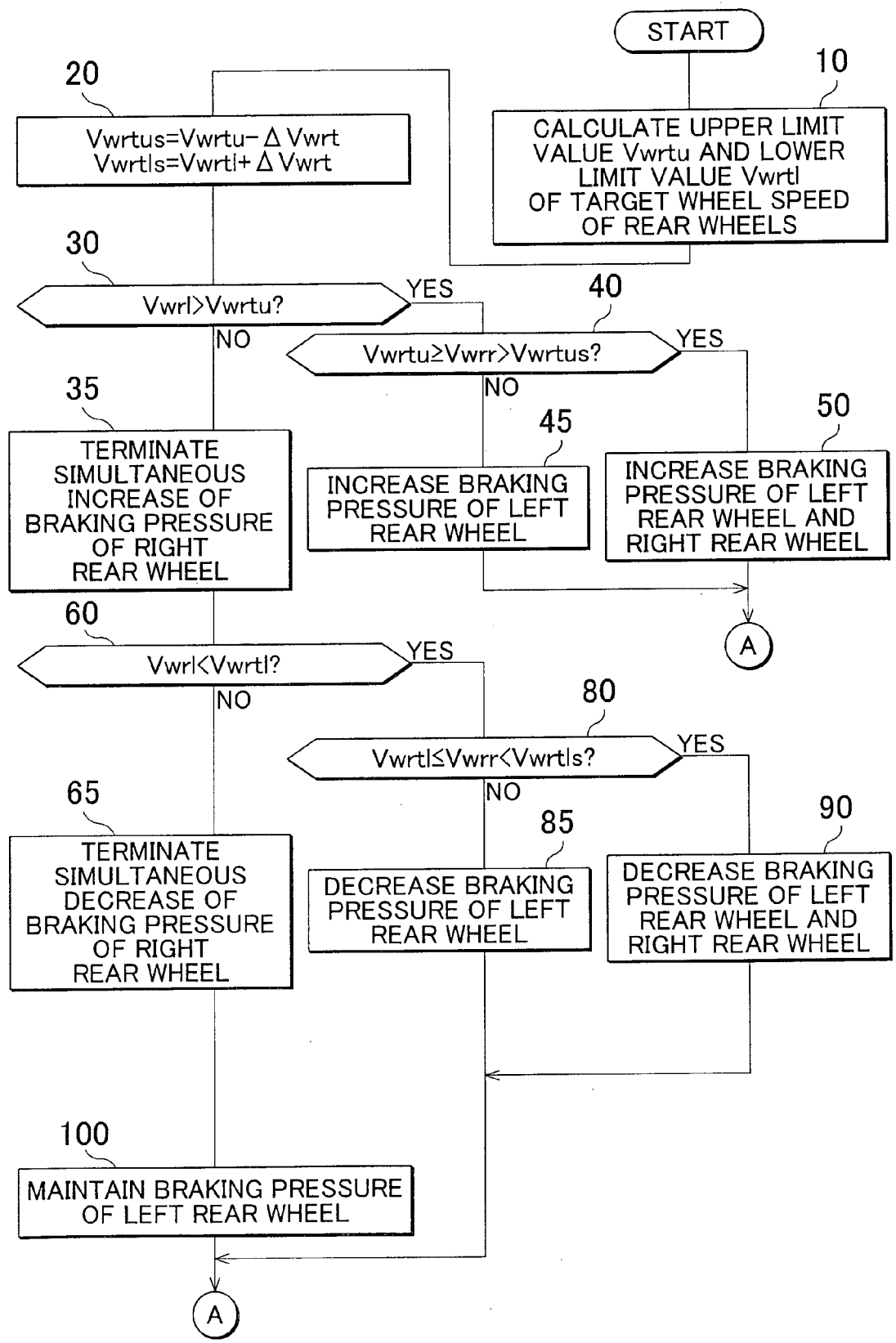
FIG. 3 is a flowchart illustrating a first half of a front and rear wheel distribution control routine of braking force in the first embodiment.
Figure 4:
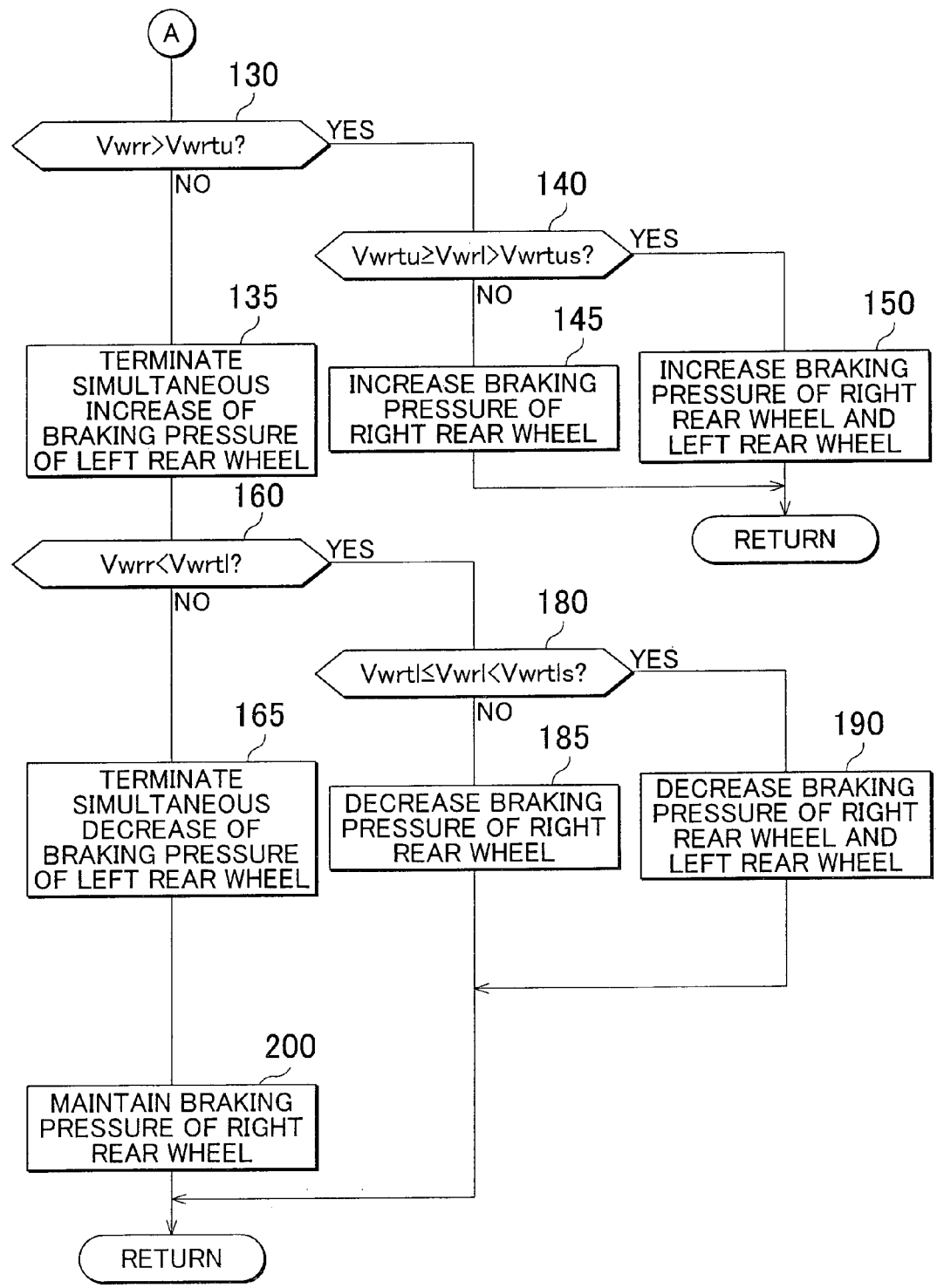
FIG. 4 is a flowchart illustrating a second half of a front and rear wheel distribution control routine of braking force in the first embodiment.

An explanation follows next, with reference to the flowchart illustrated in FIGS. 3 and 4, on a front and rear wheel distribution control routine of braking force in a first embodiment. Control according to the flowchart illustrated in FIGS. 3 and 4 is initiated when the master cylinder pressure Pm is equal to or greater than a control start determination reference value Pms (positive constant), and is repeatedly executed every predefined time until the master cylinder pressure Pm becomes equal to or smaller than a control end determination reference value Pme (positive constant). Front and rear wheel distribution control of braking force is discontinued when, during execution of the front and rear wheel distribution control of braking force, it becomes necessary to control individually the braking force of a wheel, as in antiskid control or vehicle motion control.

Firstly, in step 10, a vehicle speed V is calculated on the basis of a wheel speed Vwi of each wheel, and a differential value of the vehicle speed V is calculated as a vehicle deceleration Vd. An upper limit value ΔVwxu and a lower limit value ΔVwxl (positive values) of a target wheel speed difference of a rear wheel with respect to a front wheel are calculated on the basis of the vehicle speed V and the vehicle deceleration Vd, in such a way so as to be greater the higher the vehicle speed V is, and in such a way so as to be greater the, higher the vehicle deceleration Vd is. A respective sum of the wheel speed Vwfmax that is highest from among the left and right front wheels and the upper limit value ΔVwxu or the lower limit value ΔVwxl is calculated as the upper limit value Vwrtu or the lower limit value wrtl of the target control range of wheel speed of the rear wheels.

In step 20, the upper limit value Vwrtus and lower limit value wrtls of a sub-target control range of wheel speed of the rear wheels are calculated in accordance with Expressions 1 and 2 below, where a margin ΔVwrt is a positive constant.

$$Vwrtus = Vwrtu - \Delta Vwrt \quad (1)$$

$$Vwrtls = Vwrtl + \Delta Vwrt \quad (2)$$

The margin ΔVwrt can be variably set on the basis of the vehicle speed V, the vehicle deceleration Vd, or a vehicle deceleration slope Vdd, which is a differential value of the vehicle deceleration Vd, in such a way so as to take on a greater value the greater the vehicle speed V, the vehicle deceleration Vd or the vehicle deceleration slope Vdd is.

In step 30, it is discriminated whether a wheel speed Vwrl of the left rear wheel exceeds the upper limit value Vwrtu of the target control range, i.e. whether it is necessary to increase the braking force of the left rear wheel. Upon affirmative discrimination, the control process proceeds to step 40, and upon negative discrimination, the control process proceeds to step 35.

In step 35, it is discriminated whether the braking pressure of a right rear wheel increases accompanying an increase of the braking pressure of the left rear wheel, through execution of a below-described step 50; i.e. it is discriminated whether it is necessary to terminate an increase in the braking pressure of the right rear wheel in concert with the termination of increase of the braking pressure of the left rear wheel. Upon affirmative discrimination, increase of the braking pressure of the right rear wheel is terminated, and thereafter the control process proceeds to step 60. In case of negative discrimination, the braking pressure of the right rear wheel is not increased in the first place, and the control process proceeds unchanged to step 60.

In step 40, it is discriminated whether a wheel speed Vwrr of the right rear wheel is equal to or smaller than the upper limit value Vwrtu of the target control range and exceeds the upper limit value Vwrtus of the sub-target control range; i.e. it is discriminated whether the wheel speed Vwrr has a value that lies within the target control range and is higher than the sub-target control range. Upon affirmative discrimination, the control process proceeds to step 50, and upon negative discrimination, the control process proceeds to step 45.

In step 45, the braking force of the left rear wheel is increased by increasing the braking pressure Prl of the left rear wheel according to a pressure increase slope ΔPrinc (positive constant) set beforehand. The control process proceeds thereafter to step 130.

In step 50, the braking pressure Prl of the left rear wheel is increased according to the pressure increase slope ΔPrinc (positive constant) set beforehand, and a braking pressure Prr of the right rear wheel is increased according to a pressure increase slope ΔPrincs of sub-control. The control process proceeds thereafter to step 130. The pressure increase slope ΔPrincs of sub-control is smaller than the pressure increase slope ΔPrinc set beforehand.

In step 60, it is discriminated whether the wheel speed Vwrl of the left rear wheel is smaller than the lower limit value wrtl of the target control range, i.e. it is discriminated whether the braking force of the left rear wheel needs to be reduced. Upon affirmative discrimination, the control process proceeds to step 80, and upon negative discrimination, the control process proceeds to step 65.

In step 65, it is discriminated whether the braking pressure of the left rear wheel is reduced and the braking pressure of the right rear wheel is reduced, through execution of a below-described step 90, i.e. it is discriminated whether it is necessary to terminate an reduction in the braking pressure of the right rear wheel in concert with termination of reduction of the braking pressure of the left rear wheel. Upon affirmative discrimination, reduction of the braking pressure of the right rear wheel is terminated, and thereafter the control process proceeds to step 100. In case of negative discrimination, the braking pressure of the left rear wheel is not reduced in the first place, and the control process proceeds unchanged to step 100.

In step 80, it is discriminated whether the wheel speed Vwrl of the left rear wheel is equal to or greater than the lower limit value wrtl of the target control range and smaller than the lower limit value wrtls of the sub-target control range, i.e. it is discriminated whether the wheel speed Vwrl is value that lies within the target control range and is lower than the sub-target control range. Upon affirmative discrimination, the control process proceeds to step 90, and upon negative discrimination, the control process proceeds to step 85.

In step 85, the braking force of the left rear wheel is reduced through a decrease of a braking pressure Prlr of the left rear wheel according to a pressure decrease slope ΔPrdec (positive constant) set beforehand. The control process proceeds thereafter to step 130.

In step 90, the braking pressure Prl of the left rear wheel is decreased according to the pressure decrease slope ΔPrdec (positive constant) set beforehand, and the braking pressure Prr of the right rear wheel is decreased according to the pressure decrease slope ΔPrdecs of sub-control. The control process proceeds thereafter to step 130. The pressure decrease slope ΔPrdecs of sub-control is smaller than the pressure decrease slope ΔPrdec set beforehand.

In step 100, the braking pressure Prl of the left rear wheel is maintained, without increase or decrease, and the control process proceeds to step 130, since the wheel speed Vwrl of the left rear wheel lies within the target control range and the braking pressure of the left rear wheel is not increased or decreased simultaneously with the braking pressure of the right rear wheel.

In step 130, it is discriminated whether the wheel speed Vwrr of the right rear wheel exceeds the upper limit value Vwrtu of the target control range, i.e. it is discriminated whether the braking force of the right rear wheel needs to be increased. Upon affirmative discrimination, the control process proceeds to step 140, and upon negative discrimination, the control process proceeds to step 135.

In step 135, it is discriminated whether the braking pressure of the left rear wheel increases together with the braking pressure of the right rear wheel, through execution of a below-described step 150, i.e. it is discriminated whether it is necessary to terminate an increase in the braking pressure of the left rear wheel in concert with termination of increase of the braking pressure in the right rear wheel. Upon affirmative discrimination, increase of the braking pressure of, the left rear wheel is terminated, and thereafter the control process proceeds to step 160. In case of negative discrimination, the braking pressure of the left rear wheel is not increased in the first place, and hence the control process proceeds unchanged to step 160.

In step 140, it is discriminated whether the wheel speed Vwrl of the left rear wheel is equal to or smaller than the upper limit value Vwrtu of the target control range and exceeds the upper limit value Vwrtus of the sub-target control range; i.e. it is discriminated whether the wheel speed Vwrl is value that lies within the target control range and is higher than the sub-target control range. Upon affirmative discrimination, the control process proceeds to step 150, and upon negative discrimination, the control process proceeds to step 145.

In step 145, the braking force of the right rear wheel is increased by increasing the braking pressure Prr of the right rear wheel according to the pressure increase slope ΔPrinc set beforehand. The control process returns thereafter to step 10.

In step 150, the braking pressure Prr of the right rear wheel is increased according to the pressure increase slope ΔPrinc set beforehand, and the braking pressure Prl of the left rear wheel is increased according to the pressure increase slope ΔPrincs of sub-control. The control process returns thereafter to step 10.

In step 160, it is discriminated whether the wheel speed Vwrr of the right rear wheel is smaller than the lower limit value wrtl of the target control range, i.e. it is discriminated whether the braking force of the right rear wheel needs to be reduced. Upon affirmative discrimination, the control process proceeds to step 180, and upon negative discrimination, the control process proceeds to step 165.

In step 165, it is discriminated whether the braking pressure of the left rear wheel is reduced together with the braking pressure of the right rear wheel, through execution of a below-described step 190, i.e. it is discriminated whether it is necessary to terminate a reduction in the braking pressure of the left rear wheel in concert with termination of reduction of the braking pressure in the right rear wheel. Upon affirmative, discrimination, reduction of the braking pressure of the left rear wheel is terminated, and thereafter the control process proceeds to step 200. In case of negative discrimination, the braking pressure of the left rear wheel is not reduced in the first place, and hence the control process proceeds unchanged to step 200.

In step 180, it is discriminated whether the wheel speed Vwrl of the left rear wheel is equal to or greater than the lower limit value wrtl of the target control range and smaller than the lower, limit value wrtls of the sub-target control range, i.e. it is discriminated whether the wheel speed Vwrl is a value that lies within the target control range and is lower than the sub-target control range. Upon affirmative discrimination, the control process proceeds to step 190, and upon negative discrimination, the control process proceeds to step 185.

In step 185, the braking force of the right rear wheel is reduced through a decrease in the braking pressure Prr of the right rear wheel according to the pressure decrease slope ΔPrdec set beforehand. The control process returns thereafter to step 10.

In step 190, the braking pressure Prr of the right rear wheel is decreased according to the pressure decrease slope ΔPrdec set beforehand, and the braking pressure Prl of the left rear wheel is decreased according to the pressure decrease slope ΔPrdecs of sub-control. The control process returns thereafter to step 10.

In step 200, the braking pressure Prr of the right rear wheel is maintained, without increase or decrease, and the control process returns to step 10, since the wheel speed Vwrr of the right rear wheel lies within the target control range and the braking pressure of the right rear wheel is not increased or decreased simultaneously with the braking pressure of the left rear wheel.

In the first embodiment, control according to the flowchart illustrated in FIGS. 3 and 4 is started when the master cylinder pressure Pm becomes equal to or greater than the control start determination reference value Pms, upon start of a braking operation by the driver.

Firstly, in step 10, there are calculated the upper limit value ΔVwxu and the lower limit value ΔVwxl of the target wheel speed difference of the rear wheels with respect to the front wheels. A respective sum of the upper limit value ΔVwxu or the lower limit value ΔVwxl of the wheel speed Vwfmax that is highest from among the left and right front wheels is calculated as the upper limit value Vwrtu or lower limit value wrtl of the target control range of the wheel speed of the rear wheels.

In step 20, the upper limit value Vwrtus of sub-target control range of the wheel speed of the rear wheels is calculated as a value smaller by ΔVwrt than the upper limit value Vwrtu of the target control range, and the lower limit value wrtls of sub-target control range is calculated as a value greater by ΔVwrt than the lower limit value wrtl of the target control range.

In steps 30 to 100, the braking pressure Prl of the left rear wheels is controlled in such a manner that the wheel speed Vwrl of the left rear wheel, as a rear wheel of a first system, takes on a value that is equal to or smaller than the upper limit value Vwrtu of the target control range and equal to or greater than the lower limit value Vwrtl of the target control range.

In steps 130 to 200, similarly, the braking pressure Prr of the right rear wheel is controlled in such a manner that the wheel speed Vwrr of the right rear wheel, as a rear wheel of a second system, takes on a value that equal to or smaller than the upper limit value Vwrtu of the target control range and equal to or greater than the lower limit value Vwrtl of the target control range.

Through the above control of the braking pressure of the left and right rear wheels, the braking force of the left and right rear wheels is controlled in such a manner that the wheel speeds Vwrl and Vwrr of the left and right rear wheels take on values that lie within the target control range with respect to the wheel speed Vwfmax that is highest from among the left and right front wheels. As a result, the front and rear wheel distribution of braking force is controlled to a preferred distribution.

In the first embodiment, in particular, affirmative discrimination is performed in steps 30 and 40 when the wheel speed Vwrl of the left rear wheel exceeds the upper limit value Vwrtu of the target control range in a situation where the wheel speed Vwrr of the right rear wheel is a value lying within the target control range and outside the sub-target control range. In step 50, there is increased not only the braking pressure Prl of the left rear wheel, but also, simultaneously therewith, the braking pressure Prr of the right rear wheel.

Affirmative discrimination is performed in steps 60 and 80 when the wheel speed Vwrl of the left rear wheel is smaller than the lower limit value wrtl of the target control range, in a situation where the wheel speed Vwrr of the right rear wheel is a value lying within the target control range and outside the sub-target control range. In step 90, there is decreased not only the braking pressure Prl of the left rear wheel, but also, simultaneously therewith, the braking pressure Prr of the right rear wheel.

Likewise, affirmative discrimination is performed in steps 130 and 140 when the wheel speed Vwrr of the right rear wheel exceeds the upper limit value Vwrtu of the target control range in a situation where the wheel speed Vwrl of the left rear wheel is within the target control range and outside the sub-target control range. In step 150, there is increased not only the braking pressure Prr of the right rear wheel, but also, simultaneously therewith, the braking pressure Prl of the left rear wheel.

Affirmative discrimination is performed in steps 160 and 180 when the wheel speed Vwrr of the right rear wheel is smaller than the lower limit value wrtl of the target control range in a situation where the wheel speed Vwrl of the left rear wheel is a value lying within the target control range and outside the sub-target control range. In step 190, there is reduced not only the braking pressure Prr of the right rear wheel, but also, simultaneously therewith, the braking pressure Prl of the left rear wheel.

In a conventional braking force control device, the braking pressure of the wheel is not increased or reduced if the wheel speed is a value lying within the target control range, even if the wheel speed lies outside a sub-target control range. Therefore, the solenoid on-off valves 48FR and so forth of the left and right rear wheels are opened and closed simultaneously unless the wheel speeds of both left and right rear wheels are values that lie simultaneously outside the target control range. Therefore, when the wheel speeds of the left and right rear wheels take on, substantially simultaneously, a value lying outside the target control range, the solenoid on-off valves 48FR and so forth of the respective wheels are opened and closed substantially simultaneously, whereupon operation noise and vibration are generated each time.

In the first embodiment, by contrast, in a situation where the wheel speed of one of the left and right rear wheels is a value lying within the target control range and outside the sub-target control range, the braking pressures of both the left and right rear wheels are simultaneously increased or decreased when the wheel speed of the other of the left and right rear wheels takes on a value lying outside the target control range. Accordingly, the solenoid on-off valves 48FR and so forth of both the left and right rear wheels are opened and closed simultaneously, and hence there can be reduced the frequency of occurrence of operation noise and vibration upon opening and closing of the solenoid on-off valves 48FR and so forth.

In the first embodiment, thus in a situation where the wheel speed of one of the left and right rear wheels is a value lying within the target control range and outside the sub-target control range, increase and decrease of the braking pressure of both the left and right rear wheels is terminated simultaneously when the wheel speed of the other of the left and right rear wheels takes on a value lying within the target control range. Therefore, it becomes possible to reliably prevent unnecessary continuation of the increase or decrease of the braking pressure of the one rear wheel the speed whereof has a value lying within the target control range and outside the sub-target control range.

In the first embodiment, increase or decrease of the braking pressure of one rear wheel is terminated when the wheel speed of the one rear wheel takes on a value lying within a sub-target control range, in a situation where the braking pressure of both the left and right rear wheels is increased or decreased simultaneously in steps 50, 90, 150 or 190. Therefore, it becomes possible to reliably prevent continuation of unnecessary increase or decrease of the braking pressure of the one rear wheel the speed whereof takes on a value lying within a sub-target control range.

The basic effects elicited above are likewise afforded by the below-described first to fourth embodiments.

Second Embodiment

Figure 5:
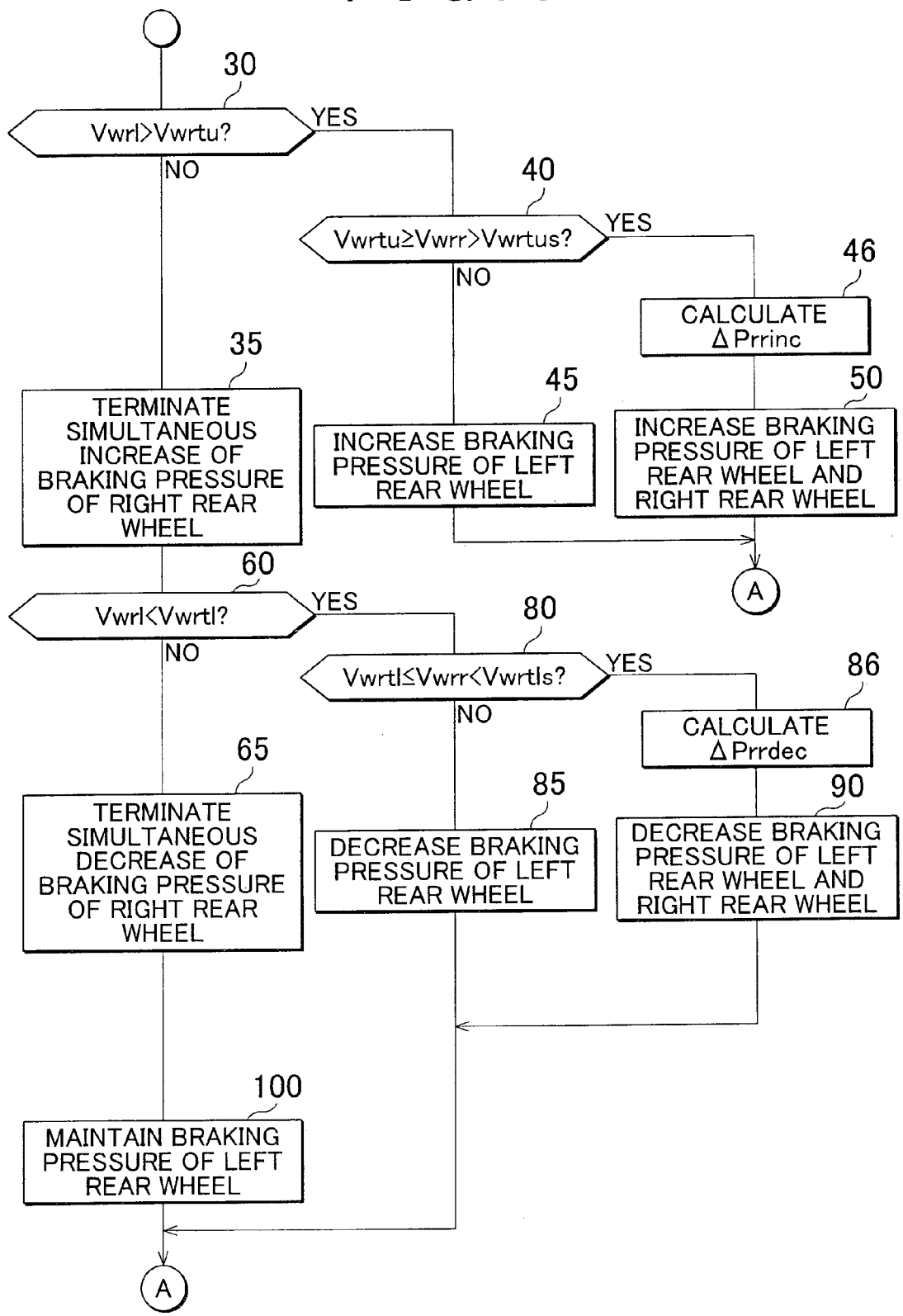
FIG. 5 is a flowchart illustrating a relevant part of a first half a front and rear wheel distribution control routine of braking force in a second embodiment of the braking force control device for a vehicle according to the invention.
Figure 6:
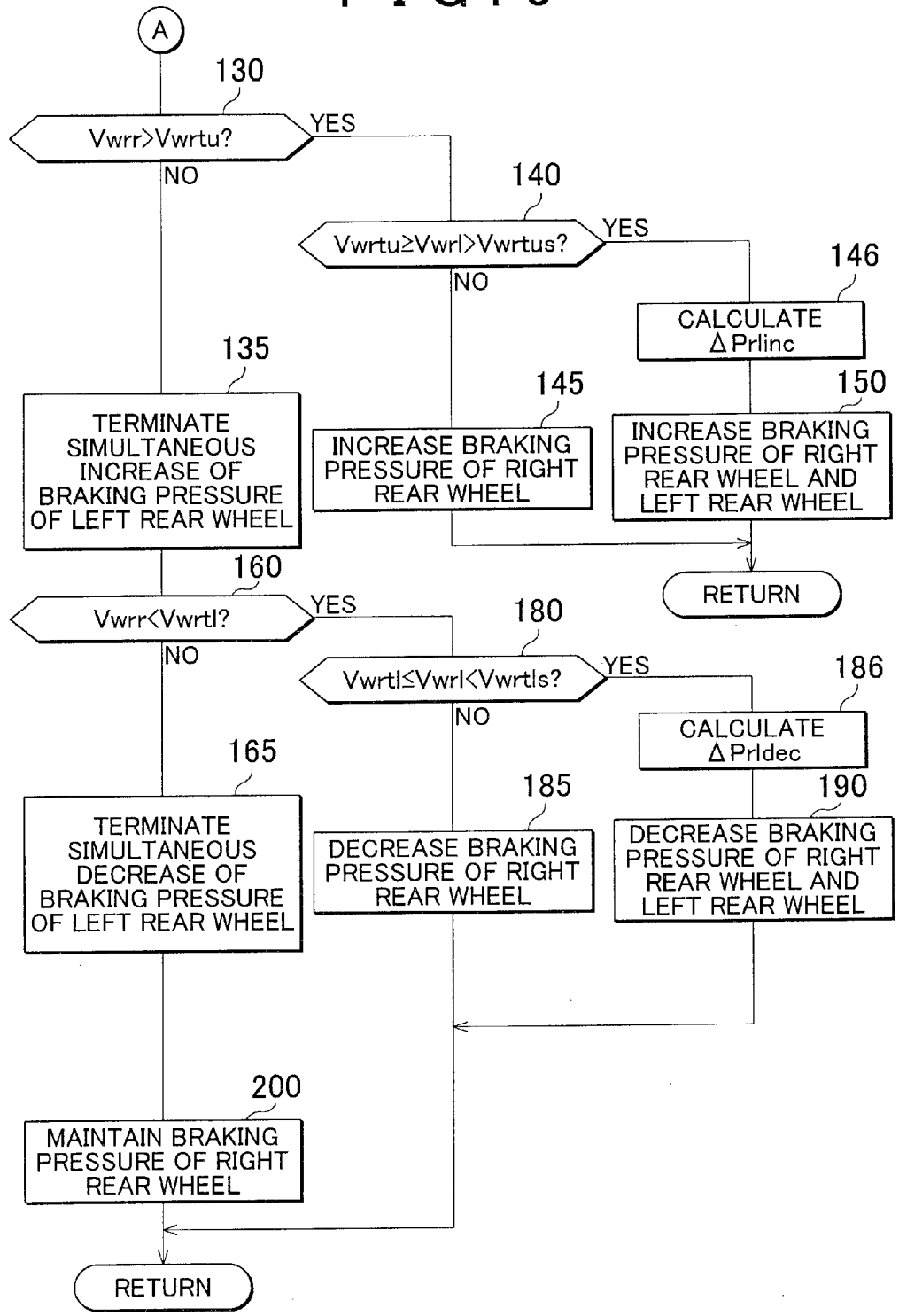
FIG. 6 is a flowchart illustrating a second half of a front and rear wheel distribution control routine of braking force in the second embodiment.

FIGS. 5 and 6 are flowcharts illustrating a relevant part of a first half and a second half of a front and rear wheel distribution control routine of braking force in a second embodiment of the braking force control device for a vehicle according to the invention. Steps in FIGS. 5 and 6 that are identical to steps illustrated in FIGS. 3 and 4 are denoted with step numbers identical to the step numbers in FIGS. 3 and 4. The same applies to other below-described embodiments.

In the second embodiment, step 46 is executed before step 50 when affirmative discrimination is performed in step 40. Similarly, step 86 is executed before step 90 when affirmative discrimination is performed in step 80.

In step 46, there is calculated a difference ΔVwrru between the wheel speed Vwrr of the right rear wheel and the upper limit value Vwrtus of the sub-target control range, and a target pressure increase slope ΔPrrinc of the right rear wheel is calculated, on the basis of the difference ΔVwrru, in such a way so as to be smaller the smaller the difference ΔVwrru is.

In step 86, there is calculated a difference ΔVwrrl between the lower limit value Vwrtls of the sub-target control range and the wheel speed Vwrr of the right rear wheel, and a target pressure decrease slope ΔPrrdec of the right rear wheel is calculated, on the basis of the difference ΔVwrrl, in such a way so as be smaller the smaller the difference ΔVwrrl is.

In the second embodiment, step 146 is executed before step 150 when affirmative discrimination is performed in step 140. Similarly, step 186 is executed before step 190 when affirmative discrimination is performed in step 180.

In step 146, there is calculated a difference ΔVwrlu between the wheel speed Vwrl of the left rear wheel and the upper limit value Vwrtus of the sub-target control range, and a target pressure increase slope ΔPrlinc of the left rear wheel is calculated, on the basis of the difference ΔVwrlu, in such a way so as be smaller the smaller the difference ΔVwrlu is.

In step 186, there is calculated a difference ΔVwrll between the lower limit value Vwrtls of the sub-target control range and the wheel speed Vwrl of the left rear wheel, and a target pressure decrease slope ΔPrldec of the left rear wheel is calculated, on the basis of the difference ΔVwrll, in such a way so as be smaller the smaller the difference ΔVwrll is.

In the second embodiment, a target pressure increase slope ΔPrrinc of the right rear wheel is calculated in step 46 when in step 40 it is discriminated that the wheel speed Vwrr of the right rear wheel lies within the target control range but exceeds the upper limit value Vwrtus of the sub-target control range. In this case, the target pressure increase slope ΔPrrinc is calculated in such a way so as to be smaller the closer the wheel speed Vwrr of the right rear wheel is to the lower limit value Vwrtls of the sub-target control range.

The target pressure decrease slope ΔPrrdec of the right rear wheel is calculated in step 86 when in step 80 it is discriminated that the wheel speed Vwrl of the left rear wheel lies within the target control range but is smaller than the lower limit value wrtls of the sub-target control range. In this case, the target pressure decrease slope ΔPrrdec is calculated in such a way so as be smaller the closer the wheel speed Vwrr of the right rear wheel is to the lower limit value Vwrtls of the sub-target control range.

Similarly, the target pressure increase slope ΔPrlinc of the left rear wheel is calculated in step 146 when in step 140 it is discriminated that the wheel speed Vwrl of the left rear wheel lies within the target control range but exceeds the upper limit value Vwrtus of the sub-target control range. In this case, the target pressure increase slope ΔPrlinc is calculated so as to be smaller the closer the wheel speed Vwrl of the left rear wheel is to the upper limit value Vwrtus of the sub-target control range.

A target pressure decrease slope ΔPrldec of the left rear wheel is calculated in step 186 when in step 180 it is discriminated that the wheel speed Vwrl of the left rear wheel lies within the target control range but is smaller than the lower limit value wrtls of the sub-target control range. In this case, the target pressure decrease slope ΔPrldec is calculated in such a way so as be smaller the closer the wheel speed Vwrl of the left rear wheel is to the lower limit value Vwrtls of the sub-target control range.

The second embodiment, accordingly, elicits the same effect as in the case of the first embodiment, and, in addition, allows reducing the increase or decrease slopes of braking pressure of wheels the speed whereof lies within the target control range but outside a sub-target control range, in such a manner that the slopes are smaller the closer the wheel speed is to a sub-target control range. Therefore, this allows reliably preventing the braking pressure of a wheel, the speed whereof lies within the target control range but outside a sub-target control range, from being increased or decreased according to an unnecessarily high pressure increase or decrease slope.

Third Embodiment

Figure 7:
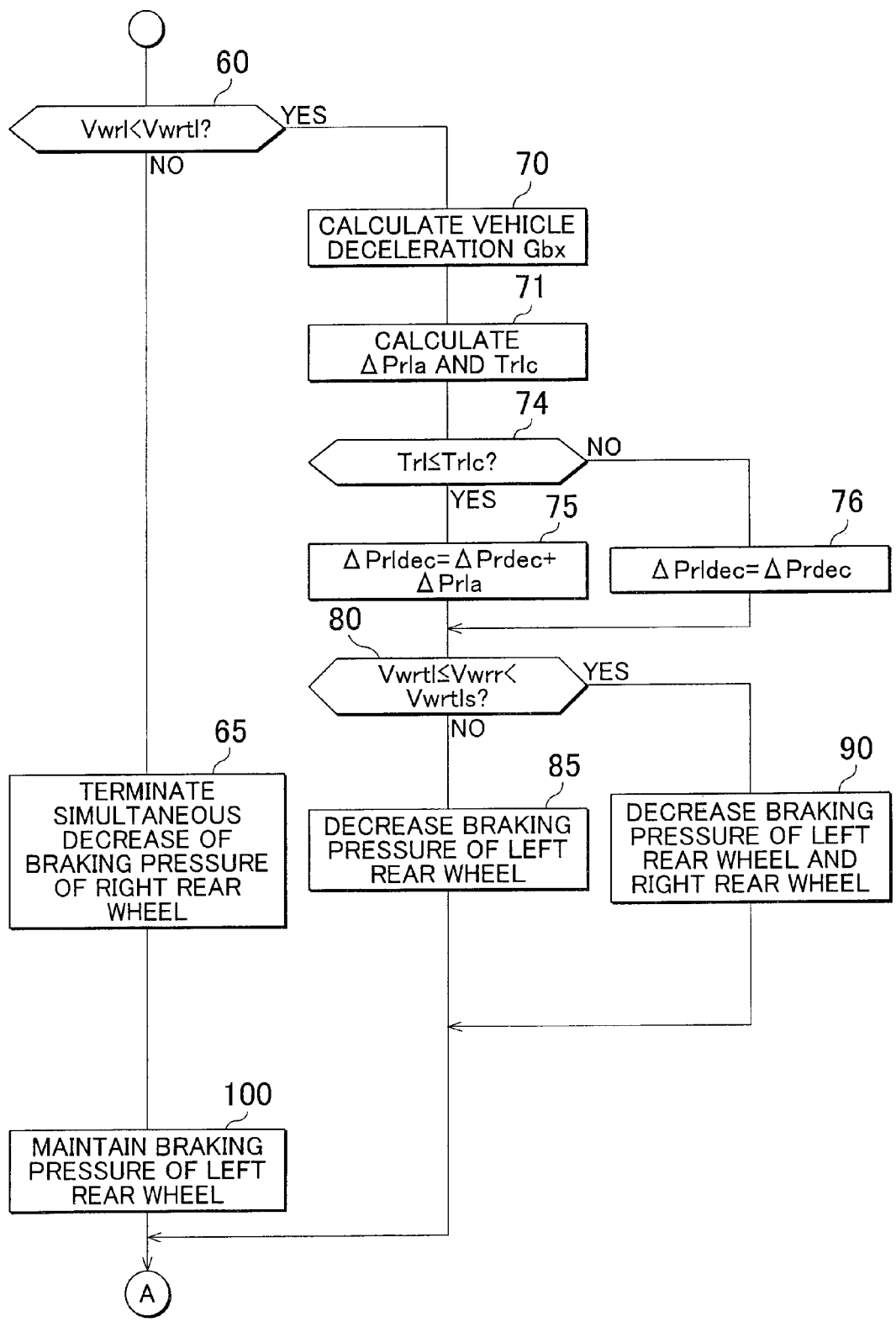
FIG. 7 is a flowchart illustrating a relevant part of a first half a front and rear wheel distribution control routine of braking force in a third embodiment of the braking force control device for a vehicle according to the invention.
Figure 8:
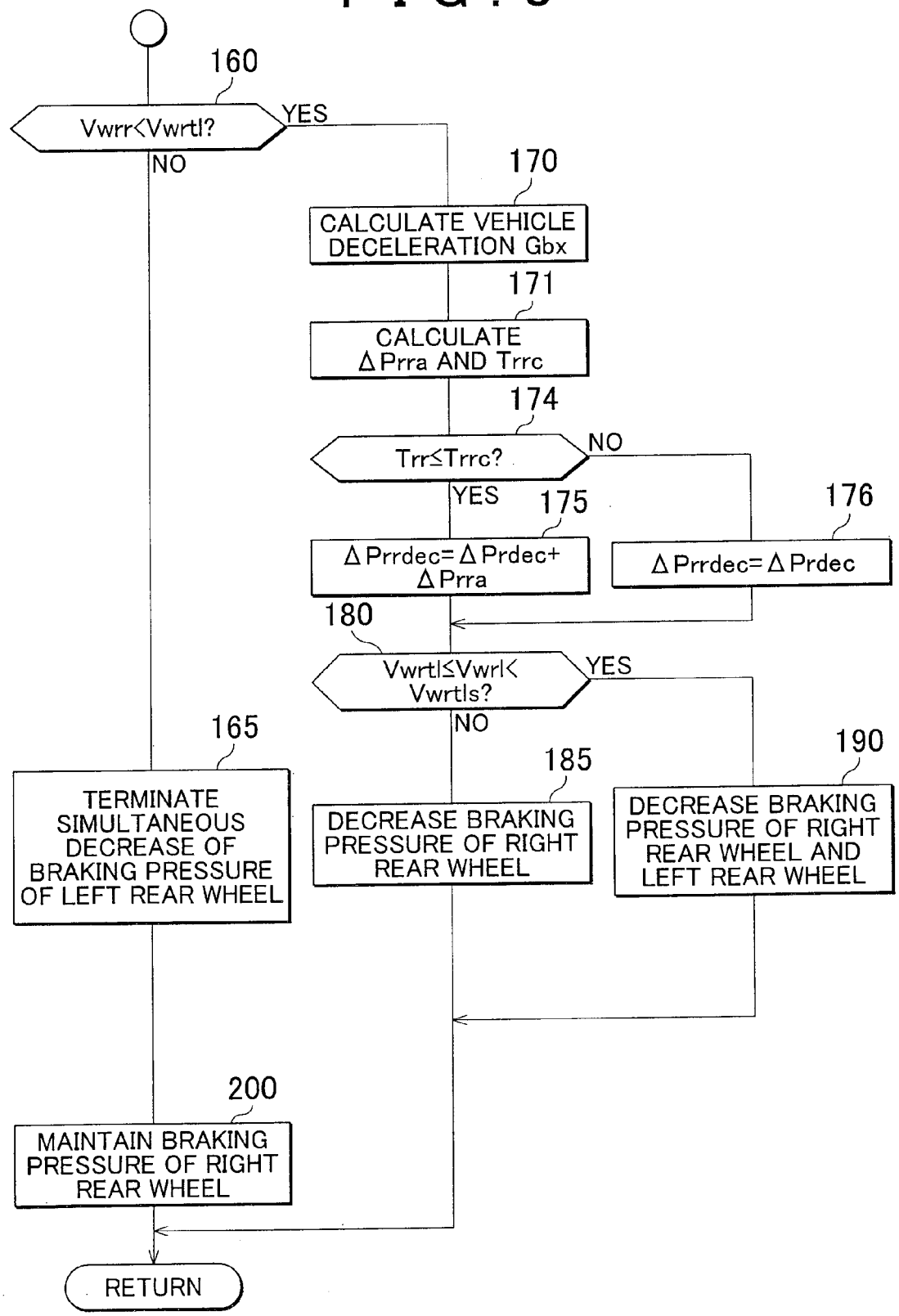
FIG. 8 is a flowchart illustrating a relevant part of a second half of a front and rear wheel distribution control routine of braking force in the third embodiment.

FIGS. 7 and 8 are flowcharts illustrating a relevant part of a first half and a second half of a front and rear wheel distribution control routine of braking force in a third embodiment of the braking force control device for a vehicle according to the invention.

In the third embodiment, steps 70 to 76 are executed before step 80 when affirmative discrimination is performed in step 60. Similarly, steps 170 to 176 are executed before step 180 when affirmative discrimination is performed in step 160.

In step 70, a vehicle deceleration Gbx is calculated as a sign inversion value of the vehicle acceleration Gx.

In step 71, a reference time Trlc and a correction amount ΔPrla of the target pressure decrease slope of the left rear wheel is calculated on the basis of the deceleration Gbx in such a manner that the correction amount ΔPrla of the target pressure decrease slope of the left rear wheel becomes greater, and the reference time Trlc longer, the higher the deceleration Gbx is.

In step 74, it is discriminated whether an elapsed time Trl since the point in time at which there is started the rear wheel distribution control of the braking force is equal to or shorter than the reference time Trlc. Upon negative discrimination, the control process proceeds to step 76, and when affirmative discrimination, the control process proceeds to step 75.

In step 75, the target pressure decrease slope ΔPrldec of the left rear wheel is set to the sum of the correction amount ΔPrla and the pressure decrease slope ΔPrdec that is set beforehand. In step 76, the target pressure decrease slope ΔPrldec of the left rear wheel is set to the pressure decrease slope ΔPrdec that is set beforehand.

In step 170, likewise, the vehicle deceleration Gbx is calculated as a sign inversion value of the vehicle acceleration Gx.

In step 171, a reference time Trrc and a correction amount ΔPrra of the target pressure decrease slope of the right rear wheel are calculated on the basis of the deceleration Gbx in such a manner that the correction amount ΔPrra of the target pressure decrease slope of the right rear wheel becomes greater, and the reference time Trrc longer, the higher the deceleration Gbx is.

In step 174, it is discriminated whether an elapsed time Trr since the point in time at which there is started the rear wheel distribution control of the braking force is equal to or shorter than the reference time Trrc. Upon negative discrimination, the control process proceeds to step 176, and upon affirmative discrimination, the control process proceeds to step 175.

In step 175, the target pressure decrease slope ΔPrrdec of the right rear wheel is set to the sum of the correction amount ΔPrra and the pressure decrease slope ΔPrdec set beforehand. In step 176, the target pressure decrease slope ΔPrrdec of the right rear wheel is set to the pressure decrease slope ΔPrdec set beforehand.

In the third embodiment, thus, the correction amount of the target pressure decrease slope can be variably set, on the basis of the deceleration Gbx, in such a manner that the correction amount ΔPrla and so forth of the target pressure decrease slope is greater the higher the vehicle deceleration Gbx is, for wheels the speed whereof lies outside the target control range.

Therefore, the pressure decrease slope of the braking pressure of a wheel the speed whereof lies outside the target control range can be increased as the vehicle deceleration Gbx and the load transfer amount towards the vehicle front become higher. As a result, braking pressure is efficiently decreased, in a situation where the vehicle deceleration Gbx is high, while preventing the pressure decrease slope of the braking pressure from becoming excessive in a situation where the vehicle deceleration Gbx is low. Accordingly, it becomes possible to reduce the frequency and number of occurrences where braking pressure is repeatedly decreased intermittently over a long period of time.

In the third embodiment, a reference time is variably set, on the basis of the deceleration Gbx, in such a manner that the reference time Trlc and so forth is longer the higher the vehicle deceleration Gbx is, for a wheel the speed whereof lies outside the target control range.

Accordingly, the time over which there is increased the pressure decrease slope of the braking pressure of a wheel the speed whereof lies outside the target control range can be lengthened as the vehicle deceleration Gbx and the load transfer amount towards the vehicle front become higher. Accordingly, the braking pressure can be efficiently decreased over a sufficient lapse of time in a situation where the vehicle deceleration Gbx is high, while preventing excessive lengthening of the time over which there increases the pressure decrease slope of braking pressure, in a situation where the vehicle deceleration Gbx is low. As a result, it becomes possible in this case as well to reduce the frequency and number of occurrences where braking pressure is repeatedly decreased intermittently over a long period of time.

In the third embodiment, thus there can be controlled, in a preferable manner, a time of efficient pressure decrease and a pressure decrease slope of braking pressure in accordance with a load transfer amount towards the vehicle front. Accordingly, it becomes possible to control the decrease of braking pressure of a wheel the speed whereof lies outside the target control range, in accordance with the braking and deceleration situation of the vehicle, in a more preferable manner than in an instance where the reference time and correction amount of the target pressure decrease slope are constant and unrelated in any way to the vehicle deceleration Gbx.

Fourth Embodiment

Figure 9:
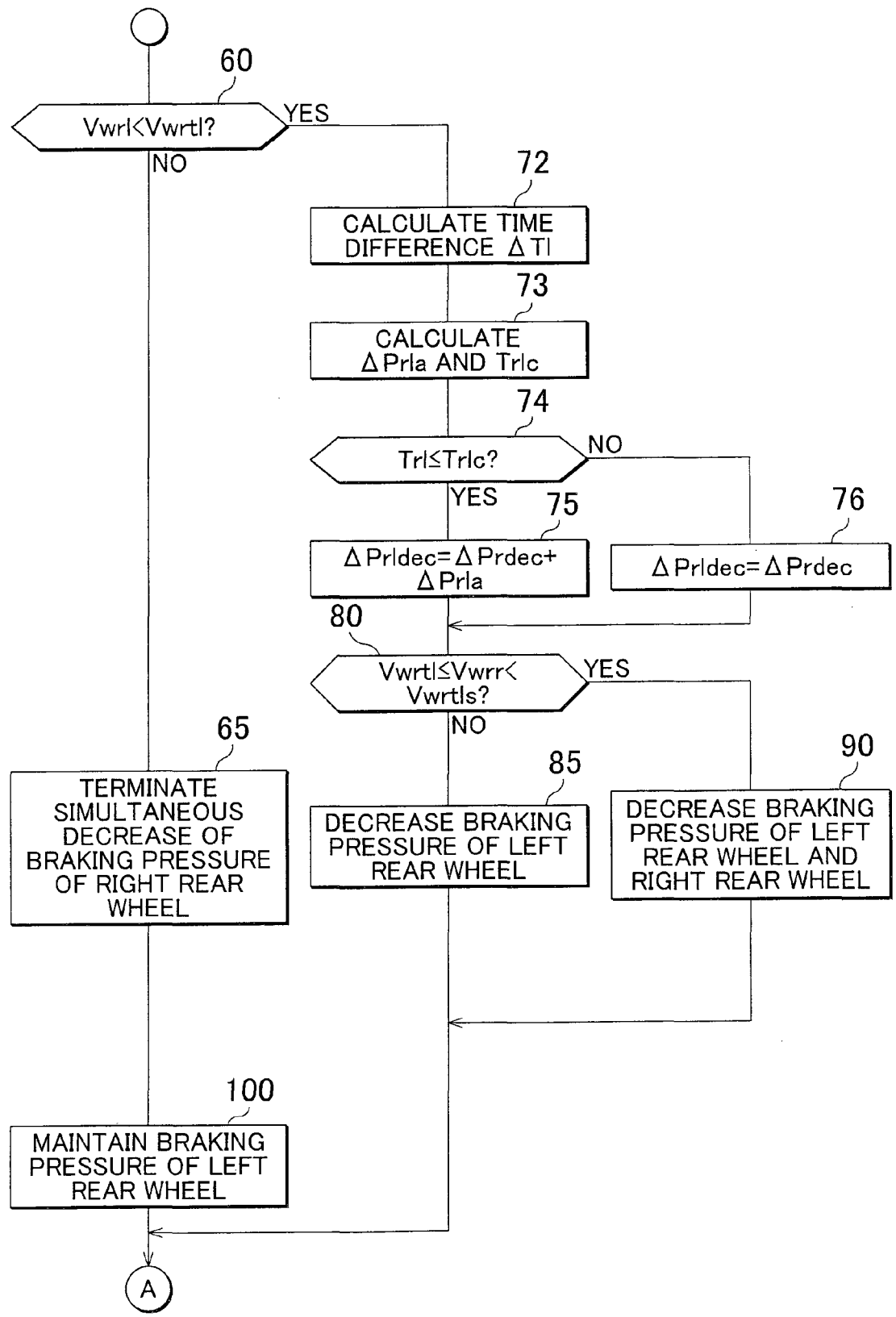
FIG. 9 is a flowchart illustrating a relevant part of a first half a front and rear wheel distribution control routine of braking force in a fourth embodiment of the braking force control device for a vehicle according to the invention.
Figure 10:
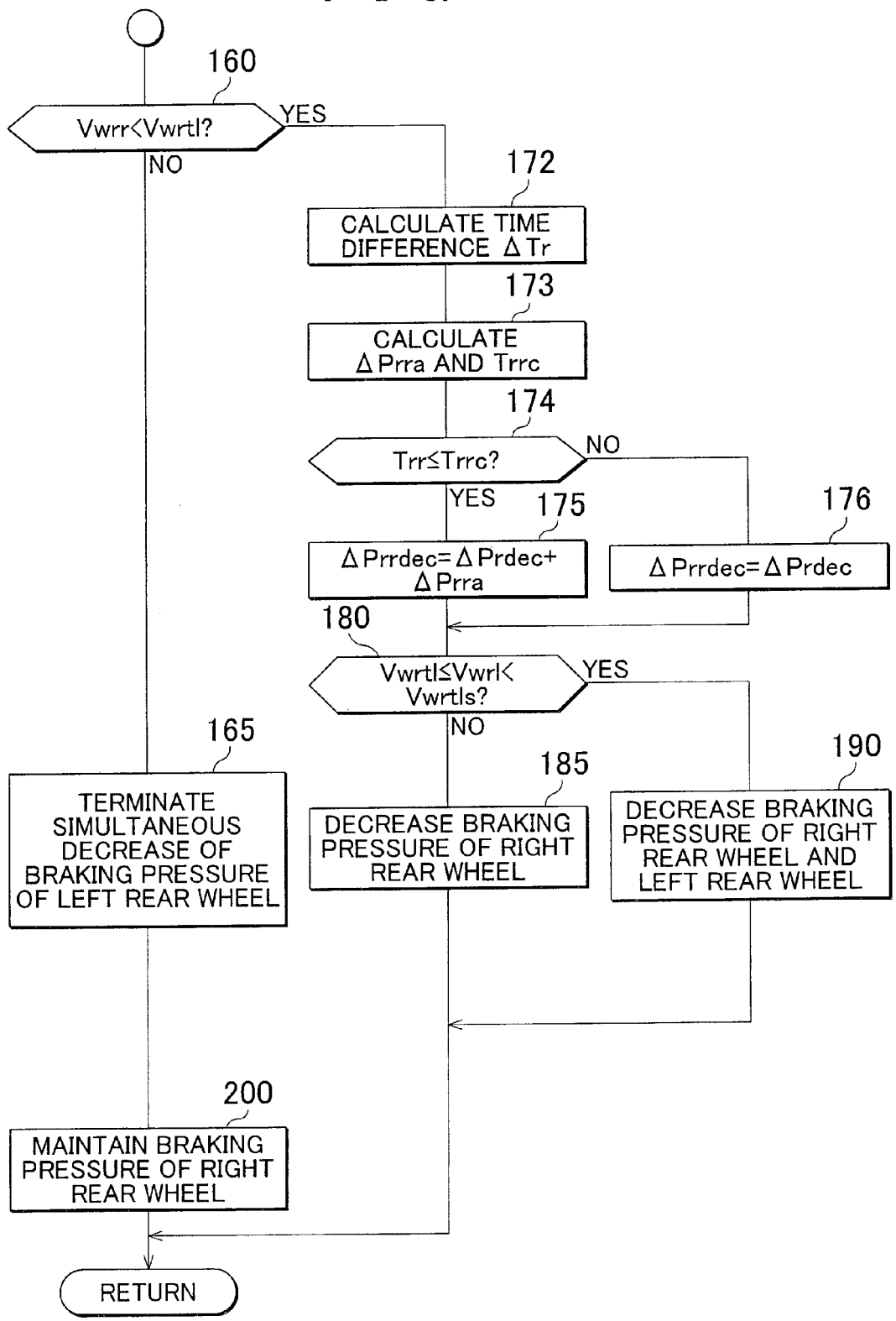
FIG. 10 is a flowchart illustrating a relevant part of a second half of a front and rear wheel distribution control routine of braking force in the fourth embodiment.

FIGS. 9 and 10 are flowcharts illustrating a relevant part of a first half and a second half of a front and rear wheel distribution control routine of braking force in a fourth embodiment of the braking force control device for a vehicle according to the invention.

In the fourth embodiment, steps 72 and 73 are executed instead of steps 70 and 71 when affirmative discrimination is performed in step 60. Similarly, steps 172 and 173 are executed instead of steps 170 and 171 when affirmative discrimination is performed in step 160. Other steps are executed in the same way as in the third embodiment described above.

In step 72, there is calculated a time difference ΔTl from a point in time at which the driver starts the braking operation up to a point in time at which there begins pressure decrease control of the braking pressure of the left rear wheel through front and rear wheel distribution control of braking force. The determination as to whether the braking operation has been started by the driver may involve, for instance, determining whether or not the master cylinder pressure Pm is equal to or greater than a reference value Pm0, of braking operation start determination, that is smaller than the control start determination reference value Pms, or may involve determining whether a stop lamp switch, not shown in the figures, is on or not. The calculation of the time difference ΔTl in step 72 is performed only immediately after the discrimination in step 60 changes from negative discrimination to affirmative discrimination.

In step 73, the reference time Trlc and correction amount ΔPrla of the target pressure decrease slope of the left rear wheel are calculated on the basis of the time difference ΔTl, in such a manner that the correction amount ΔPrla is greater, and the reference time Trlc longer, the shorter the time difference ΔTl is.

In step 172, similarly, there is calculated a time difference ΔTr from a point in time at which the driver starts the braking operation up to a point in time at which there begins pressure decrease control of the braking pressure of the right rear wheel through front and rear wheel distribution control of braking force. The calculation of the time difference ΔTr in step 172 is performed only immediately after the discrimination in step 160 changes from negative discrimination to affirmative discrimination.

In step 173, the reference time Trrc and correction amount ΔPrra of the target pressure decrease slope of the right rear wheel are calculated on the basis of the time difference ΔTr, in such a manner that the correction amount ΔPrra of the target pressure decrease slope is greater, and the reference time Trrc longer, the shorter the time difference ΔTr is.

The time difference from a point in time at which the driver starts the braking operation up to a point in time at which there begins pressure decrease control of the braking pressure of the left and rear wheels, through front and rear wheel distribution control of braking force, becomes shorter the higher the degree of braking and deceleration is, and is therefore one vehicle deceleration. Therefore, control can be performed in the same way as in control based on vehicle deceleration, on the basis of a braking time difference, even if no vehicle deceleration is detected.

In the fourth embodiment, the correction amount ΔPrla and so forth of the target pressure decrease slope becomes larger, and the reference time Trlc and so forth longer, the shorter the braking time difference is. Accordingly, the correction amount ΔPrla and so forth of the target pressure decrease slope can be increased, and the reference time Trlc and so forth can be made longer, the higher the vehicle deceleration is, on the basis of the braking time difference.

In the fourth embodiment, therefore, there can be controlled, in a preferable manner, a time of efficient pressure decrease and a pressure decrease slope of braking pressure in accordance with a load transfer amount towards the vehicle front, as in the third embodiment, without a need for detecting or estimating deceleration of the vehicle. Accordingly, it becomes possible to control the decrease of braking pressure of a wheel the speed whereof lies outside the target control range, in accordance with the braking and deceleration situation of the vehicle, in a more preferable manner than in an instance where the reference time and correction amount of the target pressure decrease slope are constant and unrelated in any way to the braking time difference.

Fifth Embodiment

Figure 11:
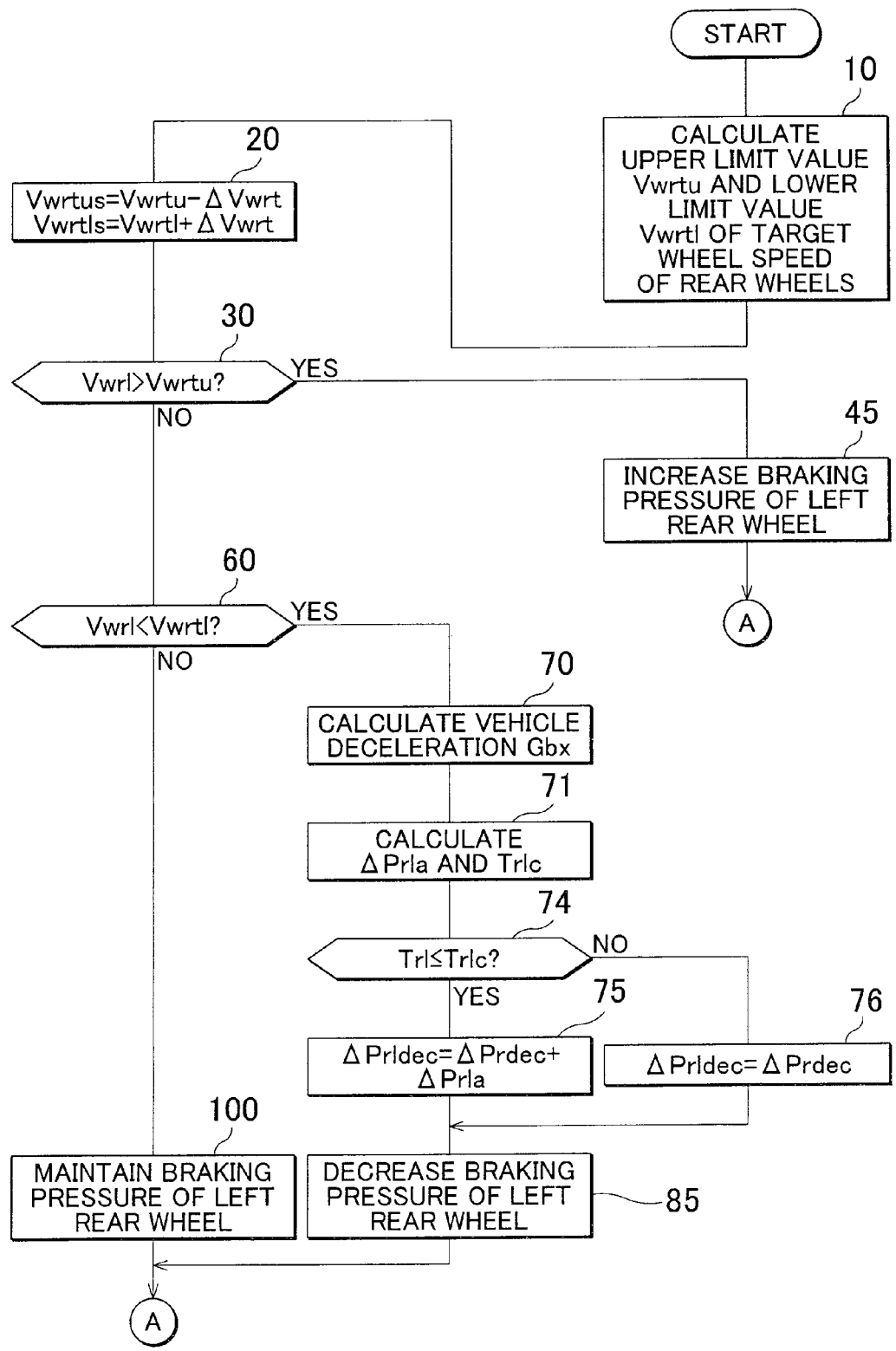
FIG. 11 is a flowchart illustrating a first half a front and rear wheel distribution control routine of braking force in a fifth embodiment of the braking force control device for a vehicle according to the invention.
Figure 12:
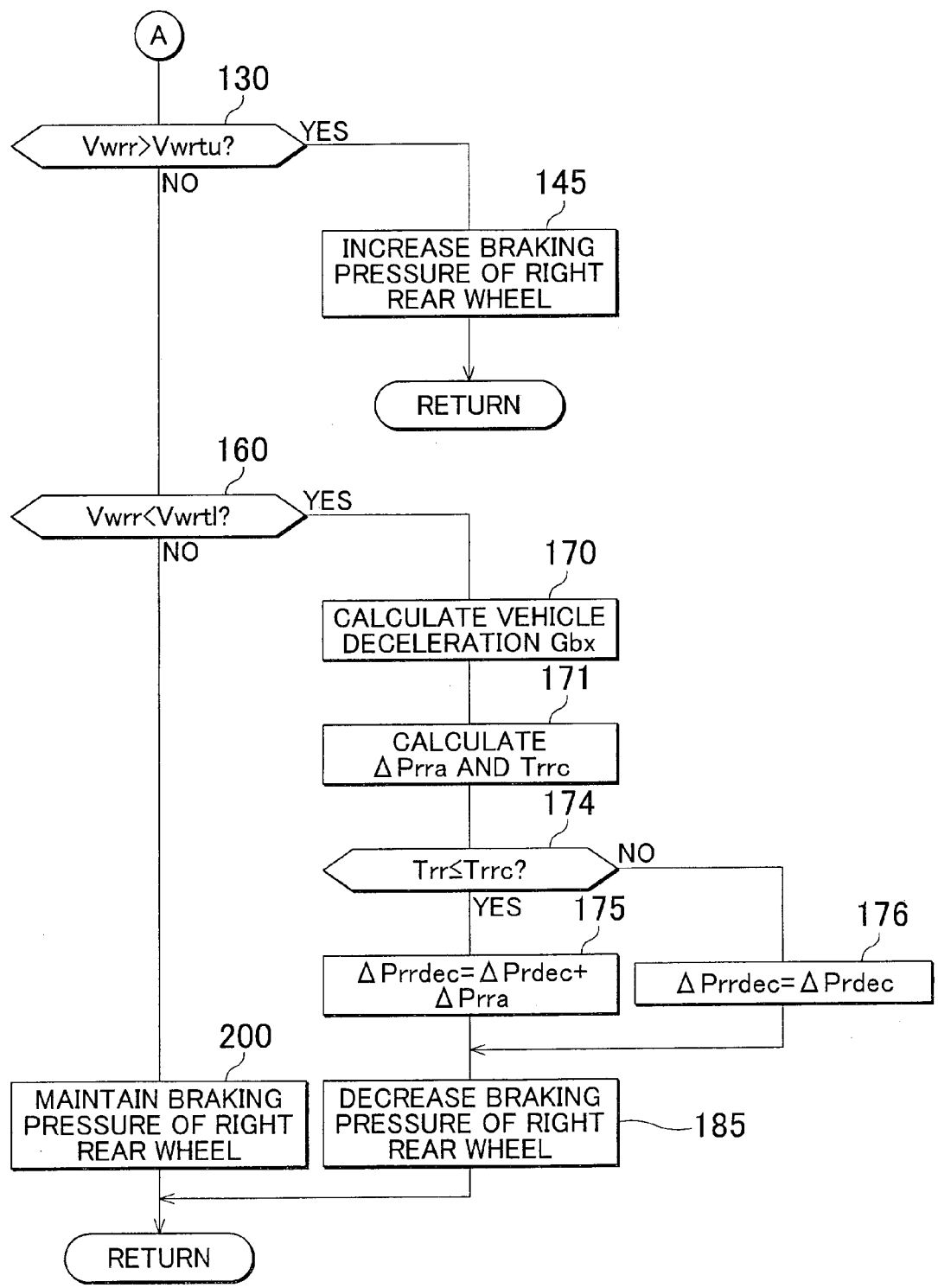
FIG. 12 is a flowchart illustrating a second half of a front and rear wheel distribution control routine of braking force in the fifth embodiment.

FIGS. 11 and 12 are flowcharts illustrating a relevant part of a first half and a second half of a front and rear wheel distribution control routine of braking force in a fifth embodiment of the braking force control device for a vehicle according to the invention.

In the fifth embodiment, the control process proceeds to step 60, without executing step 35, when negative discrimination is performed in step 30. Also, the control process proceeds to step 45, without executing steps 40 and 50, when affirmative discrimination is performed in step 30.

Similarly, the control process proceeds to step 100, without executing step 65, when negative discrimination is performed in step 60. Steps 80 and 90 are not executed, and steps 70 to 76 are executed, as in the third embodiment, when affirmative discrimination is performed in step 60. The control process proceeds thereafter to step 85.

In the fifth embodiment, the control process proceeds to step 160, without executing step 135, when negative discrimination is performed in step 130. Also, the control process proceeds to step 145, without executing steps 140 and 150, when affirmative discrimination is performed in step 130.

Similarly, the control process proceeds to step 200, without executing step 165, when negative discrimination is performed in step 160. Steps 180 and 190 are not executed, and steps 170 to 176 are executed, as in the third embodiment, when affirmative discrimination is performed in step 60. The control process proceeds thereafter to step 185. Other steps are executed in the same way as in the first embodiment described above.

In the fifth embodiment, thus, in the same way as in the third embodiment, the correction amount of the target pressure decrease slope can be variably set, on the basis of the deceleration Gbx, in such a manner that the correction amount ΔPrla and so forth of the target pressure decrease slope is greater the higher the vehicle deceleration Gbx is, for wheels the speed whereof lies outside the target control range.

Therefore, the pressure decrease slope of the braking pressure of a wheel the speed whereof lies outside the target control range can be increased as the vehicle deceleration Gbx and the load transfer amount towards the vehicle front become higher. As a result, braking pressure is efficiently decreased, in a situation where the vehicle deceleration Gbx is high, while preventing the pressure decrease slope of the braking pressure from becoming excessive in a situation where the vehicle deceleration Gbx is low. Accordingly, it becomes possible to reduce the frequency and number of occurrences where braking pressure is repeatedly decreased intermittently over a long period of time.

In the fifth embodiment, as in the third embodiment, a reference time is variably set, on the basis of the deceleration Gbx, in such a manner that the reference time Trlc and so forth is longer the higher the vehicle deceleration Gbx is, for a wheel the speed whereof lies outside the target control range.

Accordingly, it becomes possible to lengthen time over which there is increased the pressure decrease slope of the braking pressure of a wheel the speed whereof lies outside the target control range, as the vehicle deceleration Gbx and the load transfer amount towards the vehicle front become higher. Accordingly, the braking pressure can be efficiently decreased over a sufficient lapse of time in a situation where the vehicle deceleration Gbx is high, while preventing excessive lengthening of the time over which there increases the pressure decrease slope of braking pressure, in a situation where the vehicle deceleration Gbx is low. As a result, it becomes possible in this case as well to reduce the frequency and number of occurrences where braking pressure is repeatedly decreased intermittently over a long period of time.

In the fifth embodiment, as in the third embodiment, there can be controlled, in a preferable manner, a time of efficient pressure decrease and a pressure decrease slope of braking pressure in accordance with a load transfer amount towards the vehicle front. As a result, it becomes possible to control the decrease of braking pressure of a wheel the speed whereof lies outside the target control range, in accordance with the braking and deceleration situation of the vehicle, in a more preferable manner than in an instance where the reference time and correction amount of the target pressure decrease slope are constant and unrelated in any way with the vehicle deceleration Gbx.

Sixth Embodiment

Figure 13:
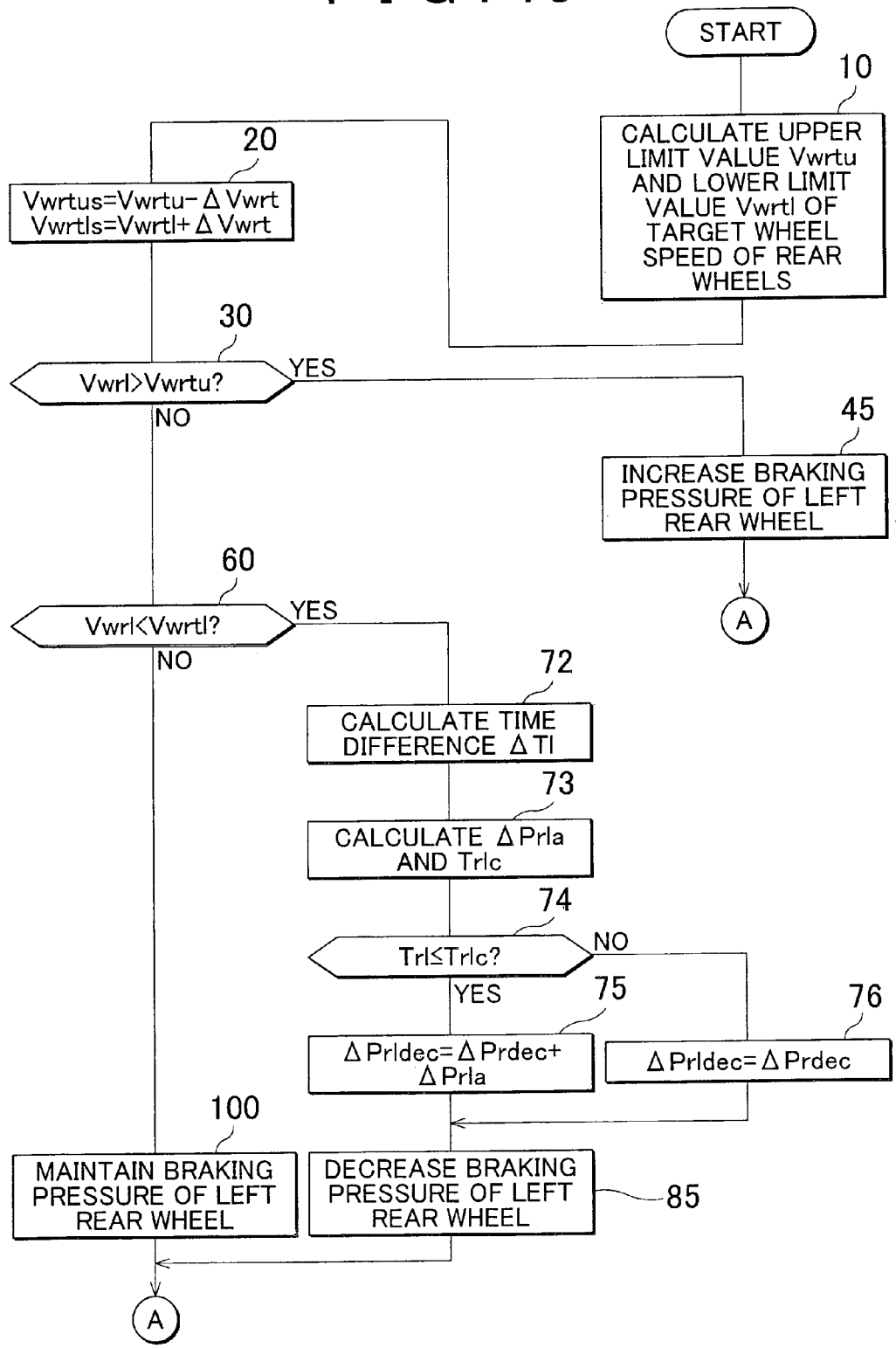
FIG. 13 is a flowchart illustrating a relevant part of a first half a front and rear wheel distribution control routine of braking force in a sixth embodiment of the braking force control device for a vehicle according to the invention.
Figure 14:
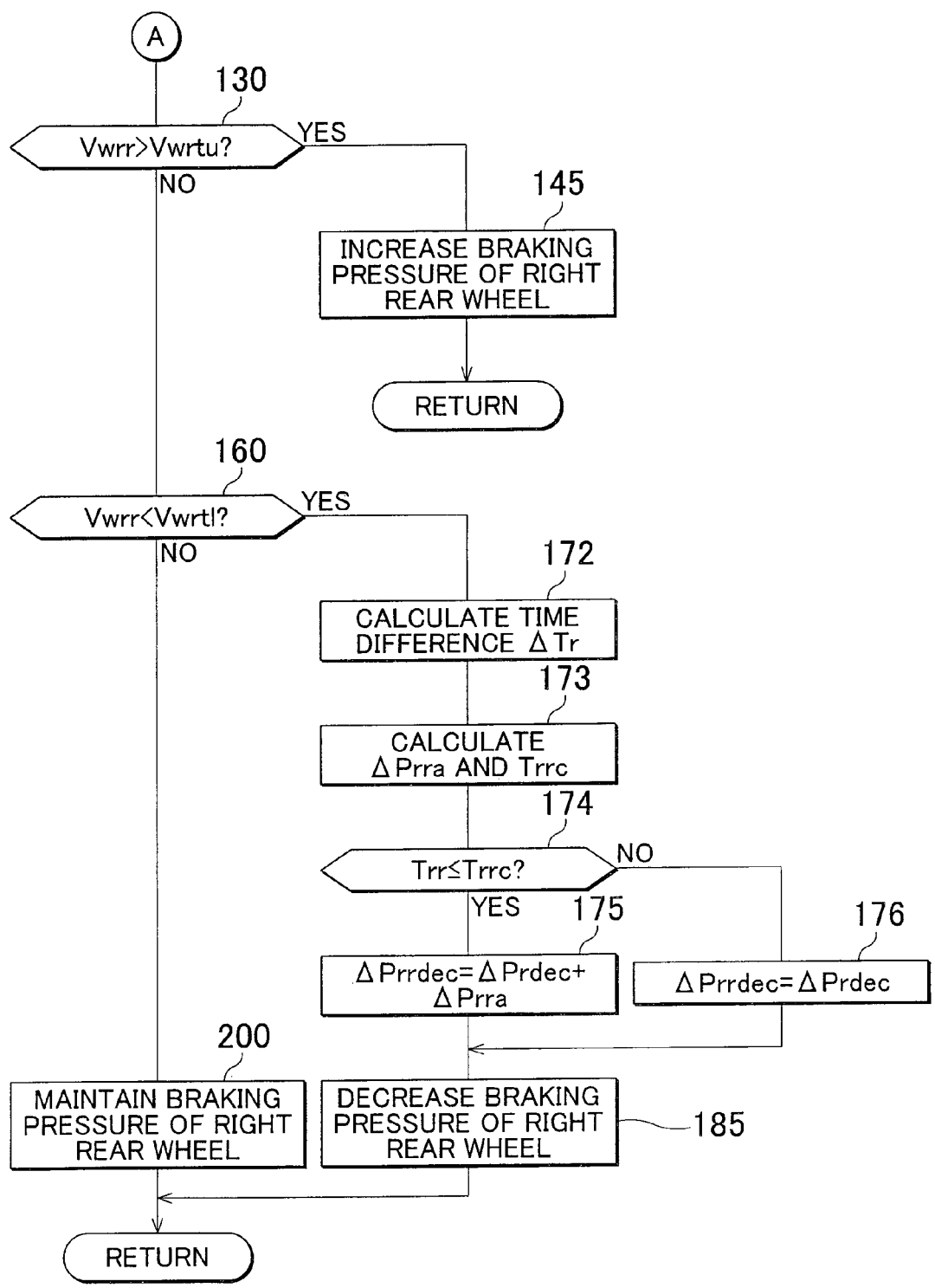
FIG. 14 is a flowchart illustrating a second half of a front and rear wheel distribution control routine of braking force in the sixth embodiment.

FIGS. 13 and 14 are flowcharts illustrating a first half and a second half of a front and rear wheel distribution control routine of braking force in a sixth embodiment of the braking force control device for a vehicle according to the invention, the configuration of the sixth embodiment being a modification example of that of the fifth embodiment.

In the sixth embodiment, steps 72 and 73 are executed instead of steps 70 and 71 when affirmative discrimination is performed in step 60. Similarly, steps 172 and 173 are executed instead of steps 170 and 171 when affirmative discrimination is performed in step 160. Other steps are executed in the same way as in the first and fourth embodiments described above.

In the sixth embodiment, as in the fourth embodiment, the correction amount ΔPrla and so forth of the target pressure decrease slope becomes larger, and the reference time Trlc and so forth longer, the shorter the braking time difference is. Accordingly, the correction amount ΔPrla and so forth of the target pressure decrease slope can be increased, and the reference time Trlc and so forth can be made longer, the higher the vehicle deceleration is, on the basis of the braking time difference.

In the sixth embodiment, therefore, there can be controlled, in a preferable manner, a time of efficient pressure decrease and a pressure decrease slope of braking pressure in accordance with a load transfer amount towards the vehicle front, as in the third and fourth embodiments, without a need for detecting or estimating deceleration of the vehicle. Accordingly, it becomes possible to control the decrease of braking pressure of a wheel the speed whereof lies outside the target control range, in accordance with the braking and deceleration situation of the vehicle, in a more preferable manner than in an instance where the reference time and correction amount of the target pressure decrease slope are constant and unrelated in any way to the braking time difference.

As made clear in the above explanation, the first to fourth embodiments allow reducing the operation frequency of the solenoid on-off valves 48RR and so forth that control the braking pressure of the left and right rear wheels, and the fifth and sixth embodiments allow reducing the frequency and number of times that on-off valves are operated intermittently. As a result, it becomes possible to reduce the frequency with which vibration and noise are generated, and transmitted to the brake pedal and so forth, accompanying the operation of the solenoid on-off valves, and there can be enhanced the sensory quality of the braking force control device.

Detailed explanations of specific embodiments of the invention have been explained above, but the invention is not limited to the above-described embodiments, and it will be apparent to a person skilled in the art that various other embodiments are encompassed within the scope of the invention.

In the embodiments above, for instance, the braking pressure is controlled based on a comparison between a wheel speed and an upper limit value and a lower limit value of a target control range. However, the above configuration can be modified into a configuration wherein the braking pressure is controlled on the basis of a degree of slip, i.e. slip amount or slip ratio, of a wheel, taking the vehicle speed as a reference speed, in such a manner that, as a result, the wheel speed takes on a value that lies within the target control range. Braking pressure may also be controlled on the basis of a comparison between the degree of slip of a wheel and an upper limit value and a lower limit value of a target control range.

In the above-described third and fifth embodiments, the index value of vehicle deceleration is the time difference ΔTl from the point in time at which a vehicle deceleration (sign inversion value of the front-rear acceleration Gx) or braking operation is started, up to a point in time at which there is started pressure decrease control of the braking pressure of the rear wheels through front and rear wheel distribution control of braking force. However, the index value of vehicle deceleration may be a master cylinder pressure or a braking operation amount estimated on the basis of, for instance, a depressing force on the brake pedal or brake pedal depression stroke. Alternatively, the index value of vehicle deceleration may be a differential value of vehicle speed estimated on the basis of the wheel speed.

In the above-described third to sixth embodiments, the target pressure decrease slope ΔPrrdec and so forth and the reference time Trrc and so forth are variably set on the basis of the vehicle deceleration Gxb or time differences ΔTl, ΔTr. However, the above configuration can be modified into a configuration wherein the target pressure decrease slope ΔPrrdec and so forth and the reference time Trrc and so forth are variably set on the basis of a rate of increase Gxbd of deceleration, taking a differential value of the vehicle deceleration Gxb as the rate of increase Gxbd of the vehicle deceleration Gxb. In this case, variable setting is performed in such a manner that the target pressure decrease slope is greater, and the reference time longer at a time where the rate of increase Gxbd of vehicle deceleration is high, than at a time where the rate of increase Gxbd of deceleration is low.

In the above-described third to sixth embodiments, both the target pressure decrease slope ΔPrrdec and so forth and the reference time Trrc and so forth are variably set on the basis of the time differences ΔTl, ΔTr or the vehicle deceleration Gxb. However, the above configuration may be modified into a configuration wherein only one from among the target pressure increase or decrease slopes and the reference time is variably set on the basis of time difference or vehicle deceleration.

In the above-described third to sixth embodiments, there is performed discrimination on whether the elapsed time since the point in time at which the rear wheel distribution control of the braking force is started is equal to or shorter than a reference time. However, the elapsed time may be set to an elapsed time from a point in time at which a decrease in braking pressure by rear wheel distribution control of braking force is started for a rear wheel.

The braking force control device for a vehicle may be configured so as to have parts that perform the respective processes. For instance, the braking force control device for a vehicle may be configured so as to have a control unit that performs simultaneous control wherein the braking pressures of the left and right rear wheels are controlled simultaneously, or may be configured so as to have a reduction control unit that increases the reduction control amount of the braking pressure.

The invention claimed is:

1. A braking force control device for a vehicle that performs front and rear wheel distribution control of a braking force by controlling individually braking pressures of left and right rear wheels such that, during braking, a wheel speed of a rear wheel takes on a value lying within a target control range that satisfies a predefined relationship with respect to a wheel speed of a front wheel, the braking force control device comprising:
a control unit configured to simultaneously control braking pressures of left and right rear wheels during braking such that
when at least the following two conditions:
(1) a wheel speed of a first rear wheel, detected by a first rear wheel speed sensor and provided to the control unit, is a value lying within the target control range and lying outside a sub-target control range that is narrower than the target control range, and
(2) a wheel speed of a second rear wheel, detected by a second rear wheel speed sensor and provided to the control unit, is a value lying outside the target control range
are met, the control unit controls the wheel speed of the second rear wheel to take on a value lying within the target control range and the wheel speed of the first rear wheel to approach the sub-target control range, and
when the wheel speed of the second rear wheel, detected by the second rear wheel speed sensor and provided to the control unit, lies within the target control range:
(1) the control unit controls the control of the braking pressure of the first rear wheel through the front and rear wheel distribution control of the braking force to be terminated, and
(2) the control unit controls the control of the braking pressure of the second rear wheel through the front and rear wheel distribution control of the braking force to be maintained.

2. The braking force control device for the vehicle according to claim 1, wherein a control amount of braking pressure of the first rear wheel is smaller than a control amount of braking pressure of the second rear wheel.

3. The braking force control device for the vehicle according to claim 1, wherein a reduction control amount of braking pressure is made greater when an elapsed time measured at a point in time during the control, beginning from a point in time at which the front and rear wheel distribution control of braking force is started, is equal to or shorter than a reference time, than when the elapsed time is longer than the reference time.

4. The braking force control device for the vehicle according to claim 3, wherein the reference time is variably set in accordance with a deceleration index value of vehicle deceleration, so as to be longer when the deceleration index value is high than when the deceleration index value is low.

5. The braking force control device for the vehicle according to claim 3, wherein an amount by which the reduction control amount of braking pressure is increased is variably set in accordance with a deceleration index value of vehicle deceleration, so as to be greater when the deceleration index value is high than when the deceleration index value is low.

6. The braking force control device for the vehicle according to claim 3, wherein the reference time is variably set in accordance with an index value of a rate of increase in deceleration of the vehicle, so as to be longer when the index value of the rate of increase in deceleration is high than when the index value of the rate of increase in deceleration is low.

7. The braking force control device for the vehicle according to claim 3, wherein the amount by which the reduction control amount of braking pressure is increased is variably set in accordance with an index value of a rate of increase in deceleration of the vehicle, so as to be greater when the index value of the rate of increase in deceleration is high than when the index value of the rate of increase in deceleration is low.

8. The braking force control device for the vehicle according to claim 6, wherein the index value of the rate of increase in deceleration is a time from a point in time at which vehicle braking is started until start of control of braking pressure of the rear wheels through the front and rear wheel distribution control of the braking force.

9. The braking force control device for the vehicle according to claim 7, wherein the index value of the rate of increase in deceleration is a time from a point in time at which vehicle braking is started until start of control of braking pressure of the rear wheels through the front and rear wheel distribution control of the braking force.

10. The braking force control device for the vehicle according to claim 1, wherein during braking includes when a master cylinder pressure is equal to or greater than a control start determination reference value.

11. The braking force control device for the vehicle according to claim 1, wherein the front and rear wheel distribution control of the braking force by controlling individually the braking pressures of the left and the right rear wheels is terminated when an antiskid control becomes necessary.

* * * * *